United States Patent
Park

(10) Patent No.: US 12,524,109 B2
(45) Date of Patent: Jan. 13, 2026

(54) DISPLAY DEVICE WITH FREQUENCY-DIVISION MULTIPLEXING

(71) Applicant: SAMSUNG DISPLAY CO., LTD., Yongin-si (KR)

(72) Inventor: Wonsang Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 66 days.

(21) Appl. No.: 18/521,953

(22) Filed: Nov. 28, 2023

(65) Prior Publication Data

US 2024/0272743 A1  Aug. 15, 2024

(30) Foreign Application Priority Data

Feb. 10, 2023  (KR) .......................... 10-2023-0018205

(51) Int. Cl.
*G06F 3/041*  (2006.01)
*G06F 3/044*  (2006.01)

(52) U.S. Cl.
CPC ........ *G06F 3/04166* (2019.05); *G06F 3/0412* (2013.01); *G06F 3/04164* (2019.05); *G06F 3/0418* (2013.01); *G06F 3/0446* (2019.05)

(58) Field of Classification Search
CPC ............... G06F 3/04166; G06F 3/0446; G06F 3/04164; G06F 3/0412; G06F 3/0418
See application file for complete search history.

(56) References Cited

U.S. PATENT DOCUMENTS

| | | | | |
|---|---|---|---|---|
| 9,092,097 B2* | 7/2015 | Kang | ..................... | G06F 3/0446 |
| 9,753,586 B2* | 9/2017 | Marino | ............... | G06F 3/04182 |
| 10,908,719 B2* | 2/2021 | Jun | ........................ | G06F 3/0443 |
| 11,243,625 B2 | 2/2022 | Kim et al. | | |
| 2011/0084857 A1* | 4/2011 | Marino | ................. | G06F 3/0446 |
| | | | | 341/5 |
| 2011/0141040 A1* | 6/2011 | Kang | .................... | G06F 3/0446 |
| | | | | 345/173 |
| 2011/0148810 A1* | 6/2011 | Kitada | ................ | G06F 3/04166 |
| | | | | 345/174 |
| 2012/0013565 A1* | 1/2012 | Westhues | .............. | G06F 3/0446 |
| | | | | 345/174 |

(Continued)

FOREIGN PATENT DOCUMENTS

| | | |
|---|---|---|
| KR | 10-1351413 | 1/2014 |
| KR | 10-1740757 | 5/2017 |
| KR | 10-2479079 | 12/2022 |

*Primary Examiner* — Ke Xiao
*Assistant Examiner* — Jennifer L Zubajlo
(74) *Attorney, Agent, or Firm* — F. CHAU & ASSOCIATES, LLC

(57) ABSTRACT

A display device includes a display panel, an input sensor, and a sensor controller. The input sensor includes transmission electrodes, reception electrodes, transmission wires electrically connecting the transmission electrodes to the sensor controller, and reception wires electrically connecting the reception electrodes to the sensor controller. The sensor controller provides transmission signals having different frequencies according to lengths of the transmission wires to the transmission electrodes, respectively. A frequency of each of the transmission signals does not overlap with a frequency component of display noise generated at a position of the display panel corresponding to each of the transmission electrodes, respectively.

18 Claims, 14 Drawing Sheets

(56) References Cited

U.S. PATENT DOCUMENTS

| | | | | |
|---|---|---|---|---|
| 2013/0057493 A1* | 3/2013 | Hwang | ................. | G06F 3/0418 |
| | | | | 345/173 |
| 2013/0147744 A1* | 6/2013 | Kim | ..................... | G06F 3/0446 |
| | | | | 345/173 |
| 2013/0162557 A1* | 6/2013 | Cho | ..................... | G06F 3/0412 |
| | | | | 345/173 |
| 2014/0340595 A1* | 11/2014 | Kim | ..................... | G06F 3/0443 |
| | | | | 349/12 |
| 2014/0340596 A1* | 11/2014 | Kim | ..................... | G06F 3/0446 |
| | | | | 349/12 |
| 2015/0083568 A1* | 3/2015 | Park | ..................... | H02H 9/046 |
| | | | | 200/600 |
| 2015/0261348 A1* | 9/2015 | Jang | ................... | G06F 3/04164 |
| | | | | 345/173 |
| 2016/0147346 A1* | 5/2016 | Lee | ..................... | G06F 3/0412 |
| | | | | 345/173 |
| 2017/0111071 A1* | 4/2017 | Yoo | ........................ | H04B 1/123 |
| 2018/0081466 A1* | 3/2018 | Moon | ................. | G06F 3/04166 |
| 2018/0107379 A1* | 4/2018 | Jia | ....................... | G06F 3/04164 |
| 2019/0204944 A1* | 7/2019 | Jun | ........................ | G06F 3/0412 |
| 2019/0302934 A1* | 10/2019 | Rhe | ........................ | G06F 3/047 |
| 2019/0302943 A1* | 10/2019 | Rhe | ........................ | G06F 3/047 |
| 2019/0302944 A1* | 10/2019 | Rhe | ...................... | G06F 3/0445 |
| 2019/0310731 A1* | 10/2019 | Rhe | ........................ | G06F 3/047 |
| 2019/0339818 A1* | 11/2019 | Rhe | ........................ | G06F 3/0443 |
| 2020/0175143 A1* | 6/2020 | Lee | ...................... | G06F 3/0446 |
| 2020/0257395 A1* | 8/2020 | Kim | ........................ | G06F 3/047 |
| 2020/0310573 A1* | 10/2020 | Hsu | ........................ | G06F 3/044 |
| 2022/0155938 A1* | 5/2022 | Hirai | ................... | G06F 3/04184 |
| 2024/0288968 A1* | 8/2024 | Lee | ...................... | G06F 3/0412 |

\* cited by examiner

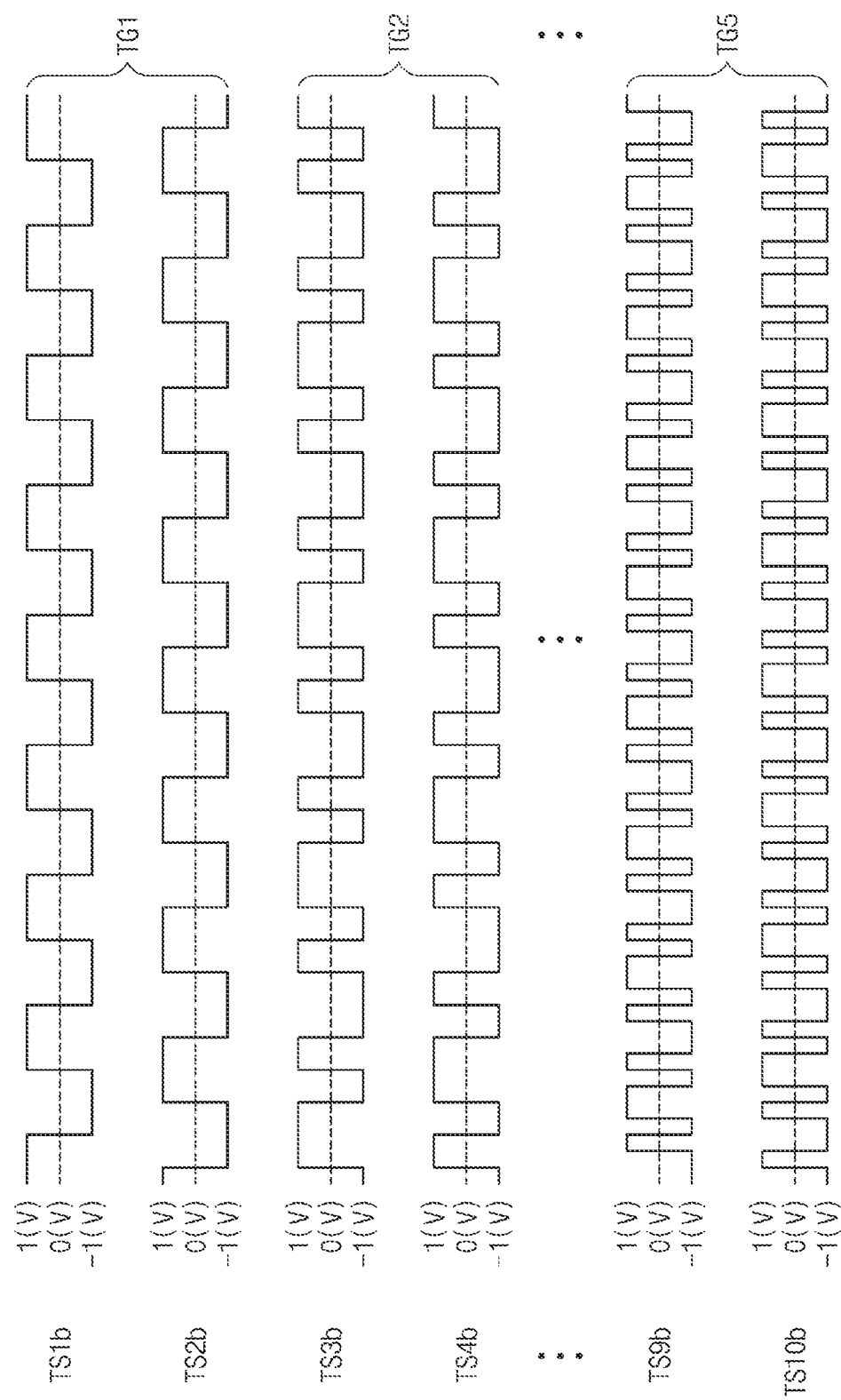

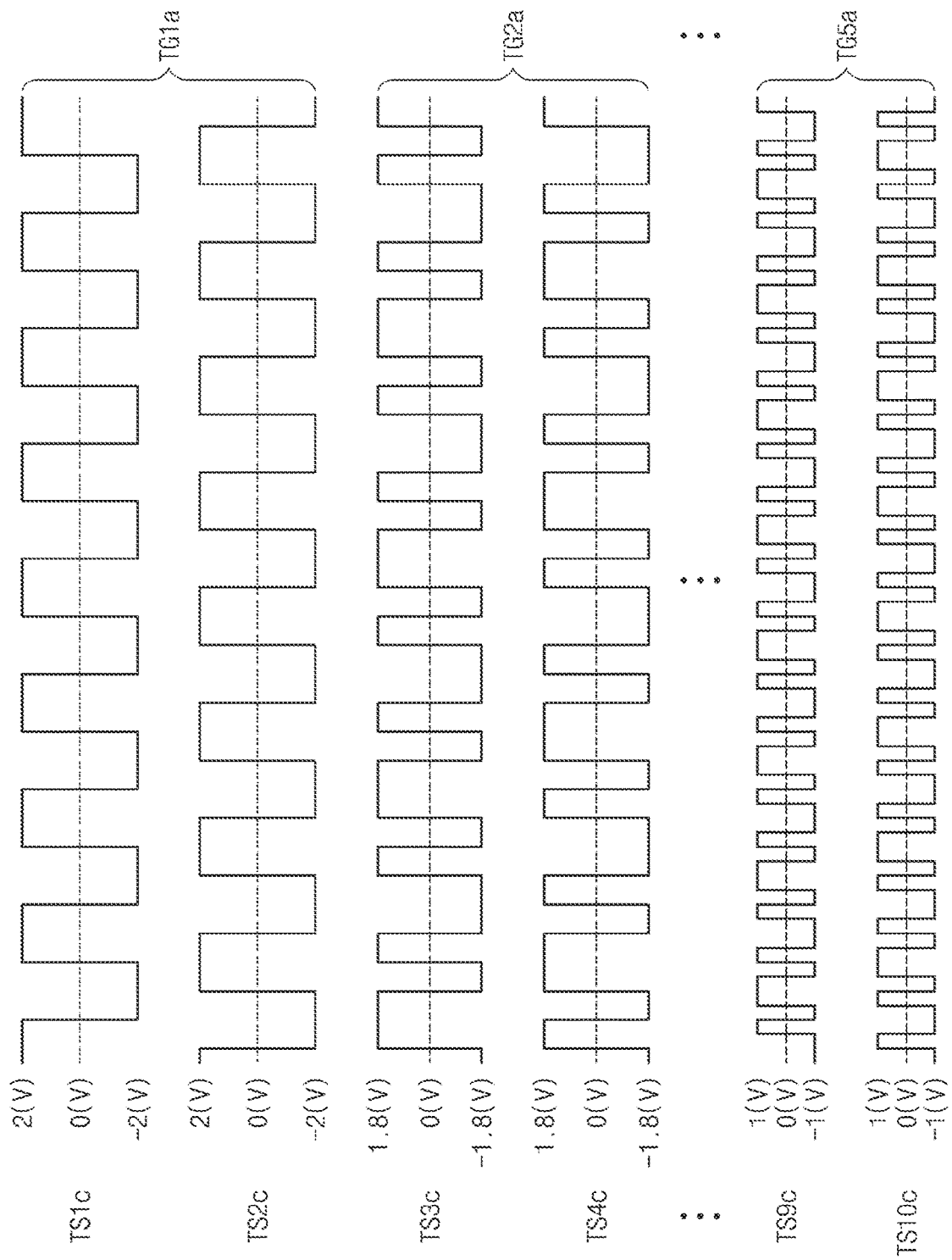

DISPLAY DEVICE WITH FREQUENCY-DIVISION MULTIPLEXING

CROSS-REFERENCE TO RELATED APPLICATIONS

This U.S. non-provisional patent application claims priority under 35 U.S.C. § 119 to Korean Patent Application No. 10-2023-0018205, filed on Feb. 10, 2023 in the Korean Intellectual Property Office (KIPO), the entire disclosure of which is hereby incorporated by reference.

FIELD

The present disclosure relates to display device technology, and more particularly relates to a display device capable of reducing power consumption with frequency allocation for touch driving.

DISCUSSION

Multimedia electronic devices such as televisions, mobile telephones, tablets, computers, navigation systems, game machines, and the like may have display devices for displaying images. In addition to the usual input methods such as buttons, keyboard and mouse, display devices may include an input sensor capable of providing a touch-based input method that allows a user to intuitively input information or commands.

SUMMARY

The present disclosure provides a display device capable of high sensing performance with respect to an input sensor, even when the size of the display device increases, such as by using frequency-division multiplexing (FDM) and/or frequency allocation for driving the input sensor.

An embodiment of the inventive concept provides a display device including a display panel; an input sensor disposed on the display panel; and a sensor controller connected to the input sensor.

The input sensor comprises: a plurality of transmission electrodes; a plurality of reception electrodes that form mutual capacitors with the plurality of transmission electrodes, respectively; a plurality of transmission wires electrically connecting the plurality of transmission electrodes to the sensor controller; and a plurality of reception wires electrically connecting the plurality of reception electrodes to the sensor controller.

The sensor controller provides a plurality of transmission signals having different frequencies based on different lengths of the plurality of transmission wires to the plurality of transmission electrodes, respectively.

A frequency of each of the plurality of transmission signals does not overlap with a frequency component of display noise generated at a position of the display panel corresponding to each of the plurality of transmission electrodes, respectively.

An embodiment of the inventive concept provides a display device including a display panel configured to display an image, an input sensor disposed on the display panel and configured to sense an input, and a sensor controller configured to control driving of the input sensor.

The input sensor includes a plurality of transmission electrodes, a plurality of reception electrodes configured to form mutual capacitors with the plurality of transmission electrodes, respectively, a plurality of transmission wires electrically connecting the plurality of transmission electrodes to the sensor controller, and a plurality of reception wires electrically connecting the plurality of reception electrodes to the sensor controller.

The sensor controller provides a plurality of transmission signals to the plurality of transmission electrodes, respectively, and the plurality of transmission signals are divided into two or more groups having different frequencies, and different codes are assigned to transmission signals of each group.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 10A and 10B are waveform diagrams illustrating transmission signals according to embodiments of the inventive concept.

DETAILED DESCRIPTION

Figure 1:
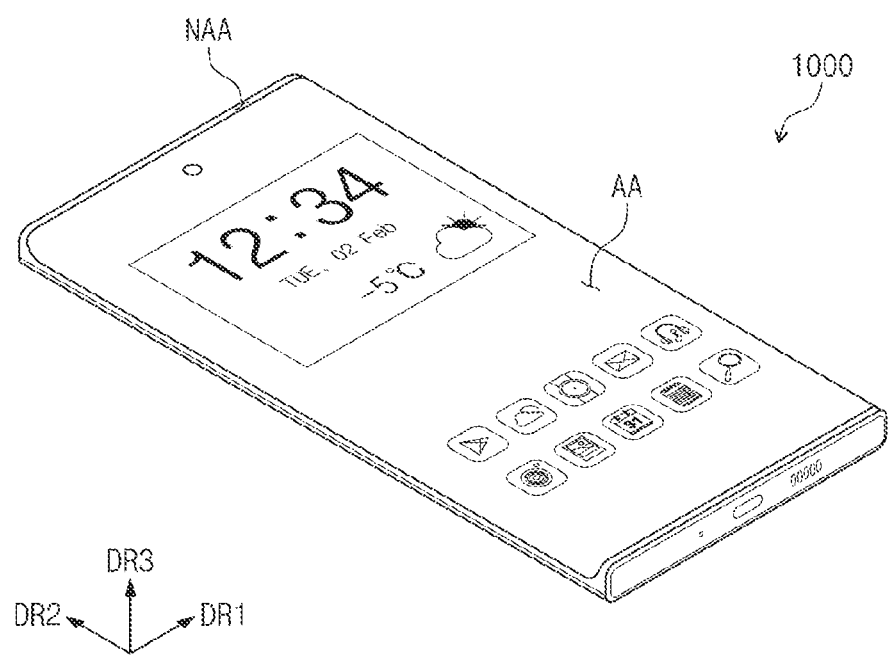
FIG. 1 is a perspective view diagram of a display device according to an embodiment of the inventive concept.

In this specification, when an element or component (e.g., region, layer, part, or the like) is referred to as being "on", "connected to", or "coupled to" another element or component, it means that the element or component may be directly placed on, connected to, and/or coupled to the other element or component, or a third element or component may be arranged between the elements and/or components.

Like reference numerals may refer to like elements, without limitation thereto. Additionally, in the drawings, the thicknesses, proportions, and dimensions of components may be exaggerated for effective description. "And/or" includes any of one or more combinations defined by related components.

It will be understood that the terms "first" and "second" may be used herein to describe various components, but these components should not be limited by these terms. The above terms are used to distinguish one component from another. For example, a first component may be referred to as a second component, and vice versa, without departing from the scope of the inventive concept. The terms for a singular form may include plural forms unless otherwise specified.

In addition, terms such as "below", "the lower side", "on", and "the upper side" may be used to describe a relationship of components as shown in a drawing. These terms are described as a relative concept based on a direction shown in the drawing.

In various embodiments of the inventive concept, a term such as "include," "comprise," "including," or "comprising," may specify a property, a region, a fixed number, a step, a process, an element and/or a component, but does not exclude other properties, regions, fixed numbers, steps, processes, elements and/or components.

Unless otherwise defined, the terms used herein, including technical and scientific terms, have the same meaning as commonly understood by those of ordinary skill in the field of art to which this inventive concept pertains. In addition, terms such as those defined in commonly used dictionaries should be interpreted as having a meaning consistent with the meaning in the context of the related technology, and should not be construed in an overly ideal or overly formal sense unless explicitly defined herein.

Hereinafter, embodiments of the inventive concept will be described with reference to the drawings.

FIG. 1 illustrates a perspective view of a display device according to an embodiment of the inventive concept.

Referring to FIG. 1, the display device 1000 may be a device that is activated according to an electrical signal. For example, the display device 1000 may be a mobile telephone, a foldable mobile telephone, a notebook computer, a television, a tablet, a car navigation system, a game console, or a wearable device, but is not limited thereto. FIG. 1 illustrates the display device 1000 as a mobile telephone.

An active area AA and a peripheral or non-active area NAA may be defined in the display device 1000. The display device 1000 may display an image through the active area AA. The active area AA may include a surface defined by the first direction DR1 and the second direction DR2. The peripheral area NAA may surround the active area AA.

The thickness direction of the display device 1000 may be parallel to the third direction DR3, intersecting the first direction DR1 and the second direction DR2. Accordingly, the front or upper and rear or lower surfaces of the members constituting the display device 1000 may be defined with respect to the third direction DR3.

Figure 2:
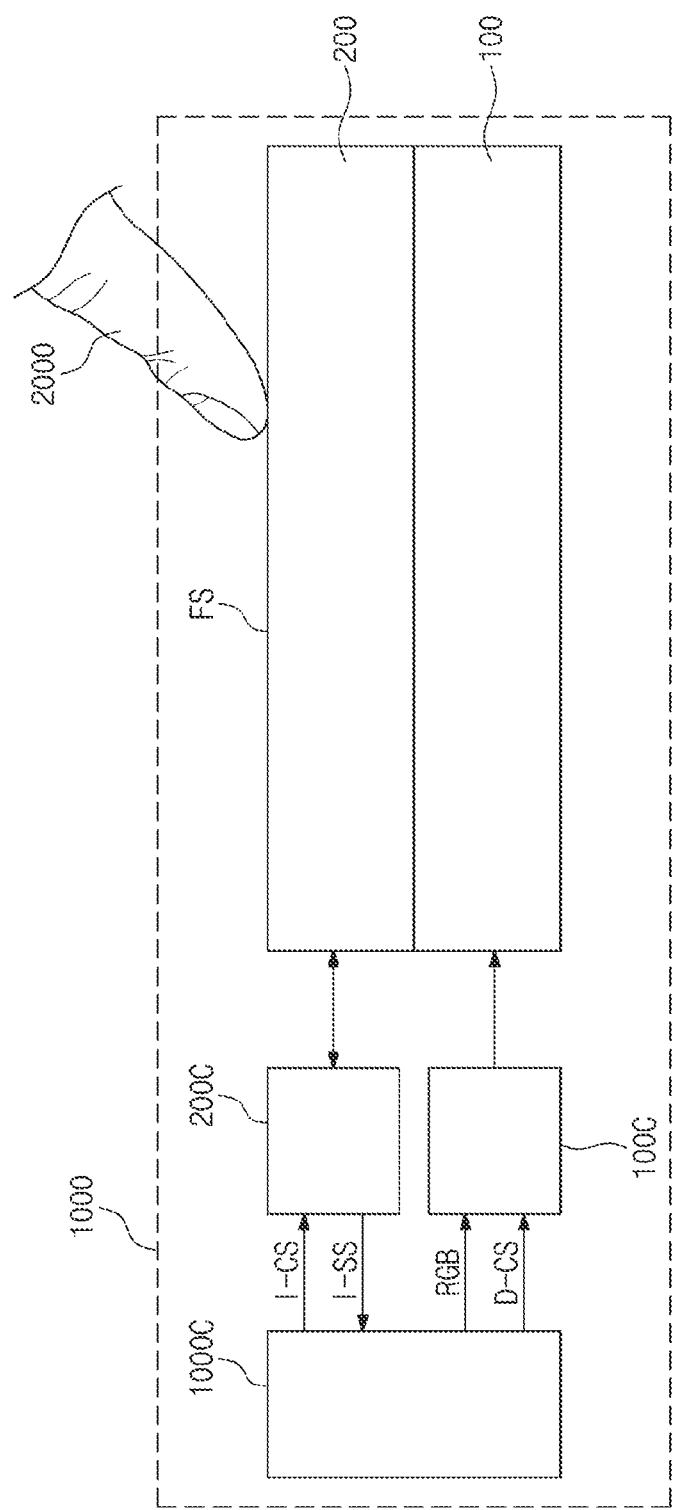
FIG. 2 is a block diagram for explaining an operation of a display device according to an embodiment of the inventive concept.

FIG. 2 is illustrated for explaining an operation of a display device according to an embodiment of the inventive concept.

Referring to FIG. 2, the display device 1000 may include a display panel 100, an input sensor 200, a display controller 100C, a sensor controller 2000, and a main controller 1000C.

The display panel 100 may be a component that substantially generates an image. The display panel 100 may be a light-emitting display panel. For example, the display panel 100 may be an organic light-emitting diode (LED) display panel, an inorganic LED display panel, a quantum dot display panel, a micro LED display panel, or a nano LED display panel.

The input sensor 200 may be disposed on the display panel 100. The input sensor 200 may detect an external input 2000 applied from the outside. The external input 2000 may include any input through an input means capable of providing a change in capacitance. For example, the input sensor 200 may detect an input by a passive type input means such as caused by a user's body (e.g., a finger), as well as an input by an active type input means such as an electronic stylus that transmits and receives a signal.

The main controller 1000C may control the overall operation of the display device 1000. For example, the main controller 1000C may control the operation of the display controller 100C and the sensor controller 2000. The main controller 1000C may include at least one microprocessor, and the main controller 1000C may be referred to as a host. The main controller 1000C may further include a memory and a programmable input/output module.

The display controller 100C may drive the display panel 100. The display controller 100C may receive an image signal RGB and a display control signal D-CS from the main controller 1000C. The display control signal D-CS may include various signals. For example, the display control signal D-CS may include a vertical synchronization signal, a horizontal synchronization signal, a main clock signal, and a data enable signal. The display controller 100C may generate a scan control signal and a data control signal for controlling driving of the display panel 100 based on the display control signal D-CS.

The sensor controller 2000 may control driving of the input sensor 200. The sensor controller 2000 may receive a sensing control signal I-CS from the main controller 1000C. The sensor controller 2000 may generate transmission signals in response to the sensing control signal I-CS and provide the transmission signals to the input sensor 200. In addition, the sensor controller 2000 may receive sensing signals from the input sensor 200 and generate a coordinate signal I-SS based on the sensing signals. The coordinate signal I-SS may include coordinate information about an input, and may be generated for use by the main controller 1000C.

The sensor controller 2000 may provide the coordinate signal I-SS to the main controller 1000C. The main controller 1000C may execute an operation corresponding to the external input 2000 based on the coordinate signal I-SS. For example, the main controller 1000C may operate the display controller 100C to display a new application image on the display panel 100.

The sensor controller 2000 may further detect an approach of an object close to the front surface FS of the display device 1000 or an input using an input device such as a stylus or pen, based on a signal received from the input sensor 200.

Figure 3A:
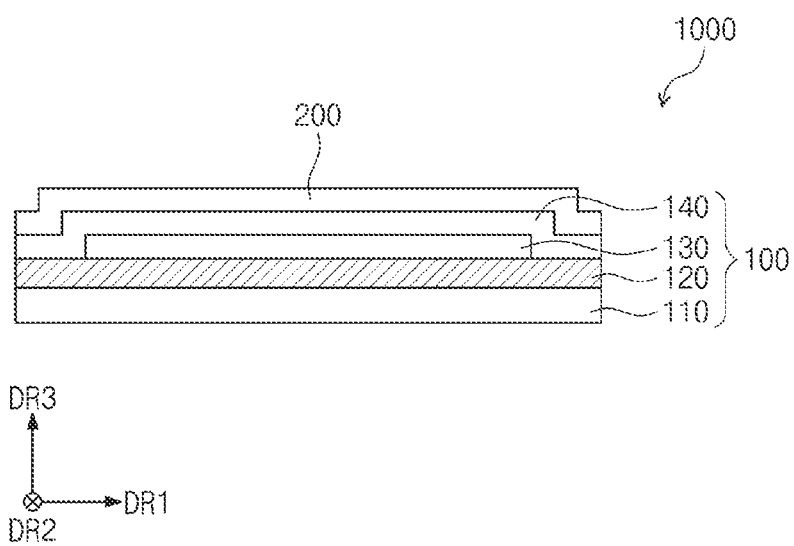
FIG. 3A is a cross-sectional view diagram of a display device according to an embodiment.

FIG. 3A illustrates a cross-sectional view of a display device according to an embodiment of the inventive concept.

Referring to FIG. 3A, the display device 1000 may include the display panel 100 and the input sensor 200. The display panel 100 may include a base layer 110, a circuit layer 120, a light-emitting element layer 130, and an encapsulation layer 140.

The base layer 110 may be a member that provides a base surface on which the circuit layer 120 is disposed. The base layer 110 may be a glass substrate, a metal substrate, or a polymer substrate, without limitation thereto. For example, the base layer 110 may be an inorganic layer, an organic layer, or a composite material layer.

The base layer 110 may have a multilayer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a base barrier layer.

Each of the first and second synthetic resin layers may include a polyimide-based resin. In addition, each of the first and second synthetic resin layers may include at least one of an acrylic resin, a methacrylate resin, a polyisoprene resin, a vinyl resin, an epoxy resin, a urethane resin, a cellulose resin, a siloxane resin, a polyamide resin, and/or a perylene resin.

The circuit layer 120 may be disposed on the base layer 110. The circuit layer 120 may include an insulating layer, a semiconductor pattern, a conductive pattern, and a signal wire. An insulating layer, a semiconductor layer, and a conductive layer are formed on the base layer 110 by a method such as coating and deposition, and thereafter, the insulating layer, the semiconductor layer, and the conductive layer may be selectively patterned through one or more photolithography processes. After that, a semiconductor pattern, a conductive pattern, and a signal wire included in the circuit layer 120 may be formed on the base layer 110.

The light-emitting element layer 130 may be disposed on the circuit layer 120. The light-emitting element layer 130 may include a light-emitting element. For example, the light-emitting element layer 130 may include an organic light-emitting material, an inorganic light-emitting material, quantum dots, quantum rods, micro light-emitting diodes (LEDs), or nano LEDs.

The encapsulation layer 140 may be disposed on the light-emitting element layer 130. The encapsulation layer 140 may protect the light-emitting element layer 130 from foreign substances such as moisture, oxygen, dust particles, or the like.

The input sensor 200 may be disposed on the display panel 100. The input sensor 200 may detect the external input 2000 (see FIG. 2) applied from the outside. The external input 2000 may be a user's input. The user's input may include various types of external inputs such as detected from a part of the user's body, light, heat, stylus, pen, pressure, or the like.

The input sensor 200 may be formed on the display panel 100 through a continuous process. In this case, the input sensor 200 may be directly disposed on the display panel 100. Here, "directly disposed" means that a third component is not disposed between the input sensor 200 and the display panel 100. That is, a separate adhesive member need not be disposed between the input sensor 200 and the display panel 100. Optionally, the input sensor 200 may be coupled to the display panel 100 through a third member such as an adhesive member. The adhesive member may include a conventional adhesive or a pressure-sensitive adhesive, without limitation thereto.

The display device 1000 may further include an antireflection layer and an optical layer disposed on the input sensor 200. The antireflection layer may reduce reflectance of external light incident from the outside of the display device 1000. The optical layer may optimize front luminance of the display device 1000 by controlling a direction of light incident from the display panel 100.

Figure 3B:
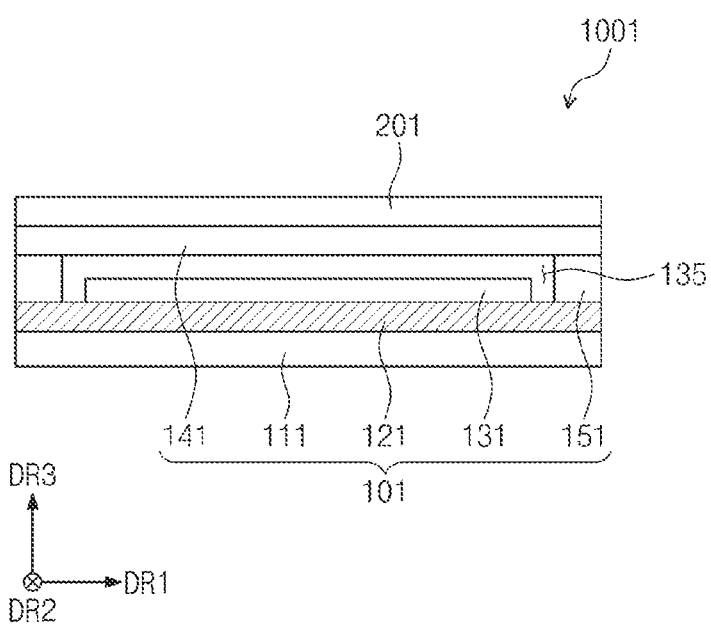
FIG. 3B is a cross-sectional view diagram of a display device according to an embodiment.

FIG. 3B illustrates a cross-sectional view of a display device according to an embodiment of the inventive concept.

Referring to FIG. 3B, a display device 1001 may include a display panel 101 and an input sensor 201. The display panel 101 may include a base substrate 111, a circuit layer 121, a light-emitting element layer 131, an encapsulation substrate 141, and a coupling member 151.

Each of the base substrate 111 and/or the encapsulation substrate 141 may be a glass substrate, a metal substrate, or a polymer substrate, without limitation thereto.

The coupling member 151 may be disposed between the base substrate 111 and the encapsulation substrate 141. The coupling member 151 may couple the encapsulation substrate 141 to the base substrate 111 or to the circuit layer 121. The coupling member 151 may include an inorganic material or an organic material. For example, the inorganic material may include a frit seal, and the organic material may include a photocurable resin or a photoplastic resin. However, the material constituting the coupling member 151 is not limited to the above example.

A predetermined space 135 may be defined between the light-emitting element layer 131 and the encapsulation substrate 141. The space 135 may be filled with air or an inert gas. Furthermore, in an embodiment of the present disclosure, the space 135 may be filled with a filling material such as, for example, a silicon-based polymer, an epoxy-based resin, or an acrylic resin.

The input sensor 201 may be placed directly on the encapsulation substrate 141. Being directly disposed may mean that a third component is not disposed between the input sensor 201 and the encapsulation substrate 141. That is, a separate adhesive member need not be disposed between the input sensor 201 and the display panel 101. However, embodiments of the inventive concept are not limited thereto. For example, an adhesive member may be further disposed between the input sensor 201 and the encapsulation substrate 141.

Figure 4:
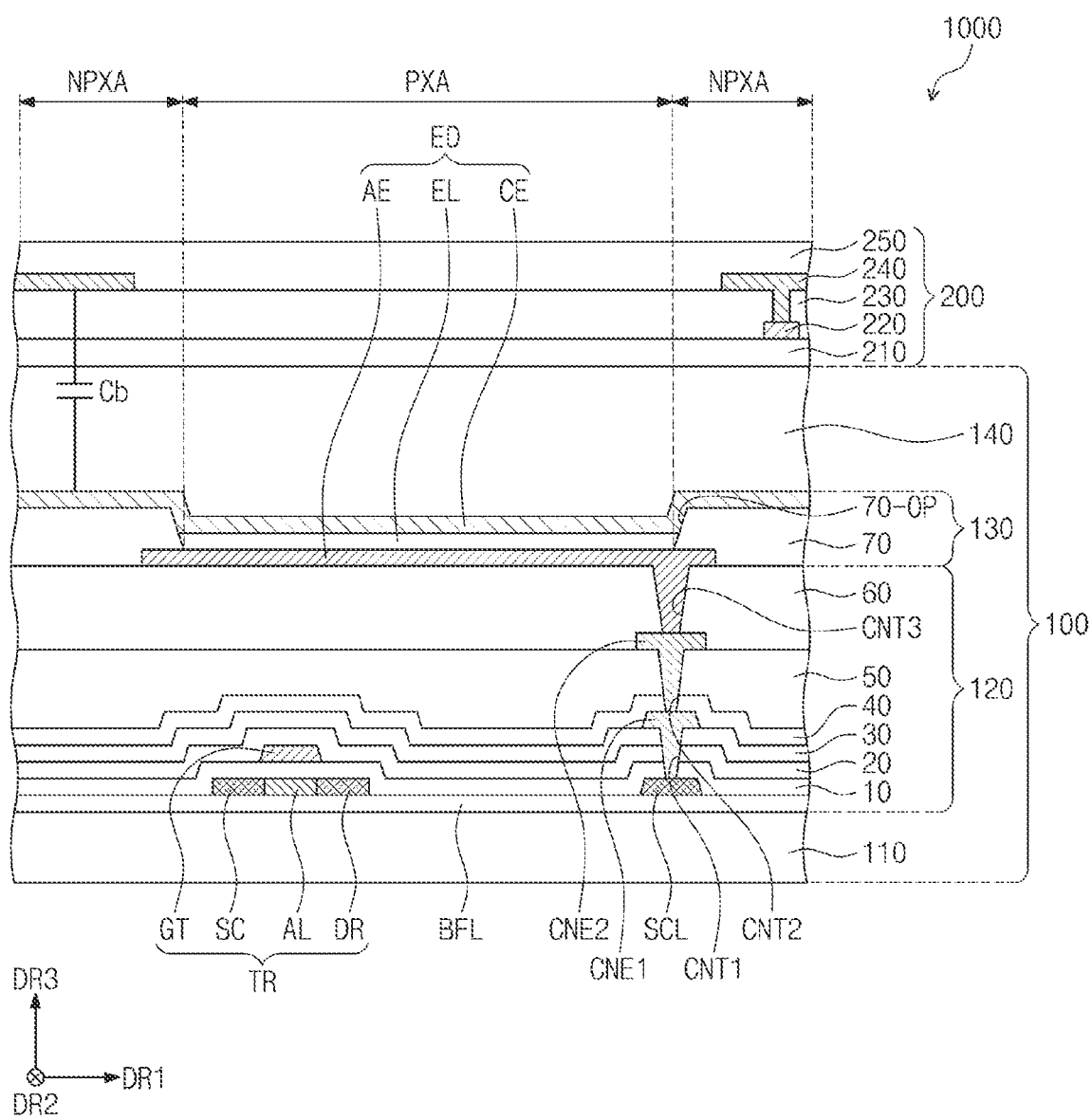
FIG. 4 is a cross-sectional view diagram of a display device according to an embodiment.

FIG. 4 illustrates a cross-sectional view of a display device according to an embodiment of the inventive concept.

Referring to FIG. 4, at least one inorganic layer is formed on the upper surface of the base layer 110. The inorganic layer may include at least one of aluminum oxide, titanium oxide, silicon oxide, silicon nitride, silicon oxynitride, zirconium oxide, and/or hafnium oxide. The inorganic layer may be formed in multiple layers. The multi-layered inorganic layers may constitute a barrier layer and/or a buffer layer. In this embodiment, the display panel 100 is shown to include a buffer layer BFL.

The buffer layer BFL may optimize bonding force between the base layer 110 and the semiconductor pattern. The buffer layer BFL may include at least one of silicon oxide, silicon nitride, and/or silicon oxynitride. For example, the buffer layer BFL may have a structure in which a silicon oxide layer and a silicon nitride layer are alternately stacked.

The semiconductor pattern may be disposed on the buffer layer BFL. The semiconductor pattern may include polysilicon. However, embodiments of the inventive concept are not limited thereto, and the semiconductor pattern may include amorphous silicon, low-temperature polycrystalline silicon, or an oxide semiconductor.

FIG. 4 illustrates some semiconductor patterns, but other semiconductor patterns may be further disposed in other areas. The semiconductor patterns may be arranged in a specific manner across the pixels.

Semiconductor patterns may have different electrical properties depending on whether or not they are doped, without limitation thereto. A semiconductor pattern may include a first area having a relatively high conductivity and a second area having a relatively low conductivity. The first area may be doped with an N-type dopant or a P-type dopant. A P-type transistor may include a doping area doped with a P-type dopant, and an N-type transistor may include a doping area doped with an N-type dopant. The second area may be a non-doped area or an area doped with a lower concentration of dopant than the first area.

The conductivity of the first area is greater than that of the second area, and may substantially serve as an electrode or a signal wire. The second area may substantially correspond to the active region or channel of the transistor. In other words, a part of the semiconductor pattern may be an active part of the transistor, another part may be a source or drain of the transistor, and another part may be a connection electrode or a connection signal wire.

Each of the pixels may have an equivalent circuit including seven transistors, one capacitor, and a light-emitting element ED. The equivalent circuit of the pixel may be modified into various forms. In FIG. 4, one transistor TR and a light-emitting element ED included in a pixel are illustrated by way of example, without limitation thereto.

A source SC, a channel AL, and a drain DR of the transistor TR may be formed from the semiconductor pattern. The source SC and the drain DR may extend in opposite directions from the channel AL on a cross section. FIG. 4 illustrates a part of a connection signal wire SCL formed from the semiconductor pattern. The connection signal wire SCL may be connected to the drain DR of the transistor TR on a plane.

A first insulating layer 10 may be disposed on the buffer layer BFL. The first insulating layer 10 may overlap one or more pixels in common and cover the semiconductor pattern. The first insulating layer 10 may be an inorganic layer and/or an organic layer, and may have a single layer or multilayer structure. The first insulating layer 10 may include at least one of aluminum oxide, titanium oxide, silicon oxide, silicon nitride, silicon oxynitride, zirconium oxide, and/or hafnium oxide. In this embodiment, the first insulating layer 10 may be a single-layer silicon oxide layer. In addition to the first insulating layer 10, each of the insulating layers included in the circuit layer 120, which may be described in greater detail further below, may be an inorganic layer and/or an organic layer, and may have a single-layer or multi-layer structure. The inorganic layer may include at least one of the above-mentioned materials, but is not limited thereto.

The gate GT of the transistor TR is disposed on the first insulating layer 10. The gate GT may be a part of the metal pattern. The gate GT overlaps the active AL. In the process of doping the semiconductor pattern, the gate GT may function as a mask.

A second insulating layer 20 is disposed on the first insulating layer 10 and may cover the gate GT. The second insulating layer 20 may overlap the pixels in common. The second insulating layer 20 may be an inorganic layer and/or an organic layer, and may have a single layer or multilayer structure. The second insulating layer 20 may include at least one of silicon oxide, silicon nitride, and/or silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may have a single layer or multilayer structure. For example, the third insulating layer 30 may have a multilayer structure including a silicon oxide layer and/or a silicon nitride layer.

A first connection electrode CNE1 may be disposed on the third insulating layer 30. The first connection electrode CNE1 may be connected to the connection signal wire SCL through a first via or contact hole CNT1 penetrating the first, second, and third insulating layers 10, 20, and 30.

A fourth insulating layer 40 may be disposed on the third insulating layer 30. The fourth insulating layer 40 may be a single layer of silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a second via or contact hole CNT2 penetrating the fourth insulating layer 40 and the fifth insulating layer 50.

A sixth insulating layer 60 is disposed on the fifth insulating layer 50 and may cover the second connection electrode CNE2. The sixth insulating layer 60 may be an organic layer.

The light-emitting element layer 130 may be disposed on the circuit layer 120. The light-emitting element layer 130 may include a light-emitting element ED. For example, the light-emitting element layer 130 may include an organic light-emitting material, an inorganic light-emitting material, quantum dots, quantum rods, micro light-emitting diodes (LEDs), or nano LEDs. Hereinafter, a description will be provided where the light-emitting element ED is an organic light-emitting element, but is not limited thereto.

The light-emitting element ED may include a first electrode AE, a light-emitting layer EL, and a second electrode CE. The first electrode AE may be disposed on the sixth insulating layer 60. The first electrode AE may be connected to the second connection electrode CNE2 through a third via or contact hole CNT3 penetrating the sixth insulating layer 60.

A pixel defining film 70 is disposed on the sixth insulating layer 60 and may cover a portion of the first electrode AE. An opening part 70-OP is defined in the pixel defining film 70. The opening part 70-OP of the pixel defining film 70 exposes at least a portion of the first electrode AE.

The active area AA, as introduced in FIG. 1, may include an emission area PXA and a non-emission area NPXA adjacent to the emission area PXA. The non-emission area NPXA may surround the emission area PXA. In this embodiment, the emission area PXA is defined to correspond to a partial area of the first electrode AE exposed by the opening part 70-OP, but embodiments are not limited thereto.

The light-emitting layer EL may be disposed on the first electrode AE. The light-emitting layer EL may be disposed in an area corresponding to the opening part 70-OP. That is, the light-emitting layer EL may be formed separately on each of the pixels. When the light-emitting layer EL is formed in one or more layers separated from each of the pixels, each of multiple light-emitting layers EL may emit light of at least one of blue, red, and green. However, embodiments of the inventive concept are not limited thereto, and the light-emitting layers EL may be integrally connected to each other and provided in common to the pixels. In such a case, the light-emitting layer EL provided in an integral shape may provide blue light or white light.

The second electrode CE may be disposed on the light-emitting layer EL. The second electrode CE has an integral shape and may be commonly disposed on one or more pixels.

A hole control layer may be disposed between the first electrode AE and the light-emitting layer EL. The hole control layer may be commonly disposed in the emission area PXA and the non-emission area NPXA. The hole control layer may include a hole transport layer, and may further include a hole injection layer. An electron control layer may be disposed between the light-emitting layer EL and the second electrode CE. The electron control layer may include an electron transport layer, and may further include an electron injection layer. The hole control layer and the electron control layer may be commonly formed in one or more pixels using an open mask.

The encapsulation layer 140 may be disposed on the light-emitting element layer 130. The encapsulation layer 140 may include an inorganic layer, an organic layer, and another inorganic layer sequentially stacked, but the layers constituting the encapsulation layer 140 are not limited thereto.

The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, and/or an aluminum oxide layer. The organic layer may include an acrylic organic layer, but is not limited thereto.

The input sensor 200 may include a base insulating layer 210, a first conductive layer 220, a detection insulating layer 230, a second conductive layer 240, and a cover insulating layer 250.

The base insulating layer 210 may be an inorganic layer including at least one of silicon nitride, silicon oxynitride, and/or silicon oxide. Alternatively, the base insulating layer 210 may be an organic layer including an epoxy resin, an acrylic resin, and/or an imide resin. The base insulating layer 210 may have a single layer structure or may have a multilayer structure stacked along the third direction DR3.

Each of the first conductive layer 220 and the second conductive layer 240 may have a single layer structure or may have a multilayer structure stacked along the third direction DR3.

The single-layered conductive layer may include a metal layer and/or a transparent conductive layer. The metal layer may include molybdenum, silver, titanium, copper, aluminum, and/or an alloy thereof. The transparent conductive layer may include a transparent conductive oxide such as indium tin oxide (ITO), indium zinc oxide (IZO), zinc oxide (ZnO), indium zinc tin oxide (IZTO), and/or the like. In addition, the transparent conductive material may include a conductive polymer such as poly(3,4-ethylenedioxythiophene) (PEDOT), metal nanowires, graphene, and/or the like.

The multilayered conductive layer may include metal layers. The metal layers may have a three-layer structure of, for example, titanium/aluminum/titanium. The multilayered conductive layer may include at least one metal layer and at least one transparent conductive layer.

At least one of the detection insulating layer 230 and/or the cover insulating layer 250 may include an inorganic layer. The inorganic layer may include at least one of aluminum oxide, titanium oxide, silicon oxide, silicon nitride, silicon oxynitride, zirconium oxide, and/or hafnium oxide.

At least one of the detection insulating layer 230 and/or the cover insulating layer 250 may include an organic layer. The organic layer may include at least one of acrylic resin, methacrylic resin, polyisoprene, vinyl resin, epoxy resin, urethane resin, cellulose resin, siloxane resin, polyimide resin, polyamide resin, and/or perylene resin.

Parasitic capacitance Cb may be generated between the input sensor 200 and the second electrode CE. The parasitic capacitance Cb may also be referred to as a base capacitance. As the distance between the input sensor 200 and the second electrode CE increases, the value of the parasitic capacitance Cb may increase. As the parasitic capacitance Cb increases, the ratio of the change amount of the capacitance to the reference value may decrease. The change in capacitance may be a value in which a change in capacitance is reflected, where the change in capacitance is generated by the external input 2000 (as introduced in FIG. 2) in response to an input means, such as in response to detection of the user's fingertip.

Figure 5:
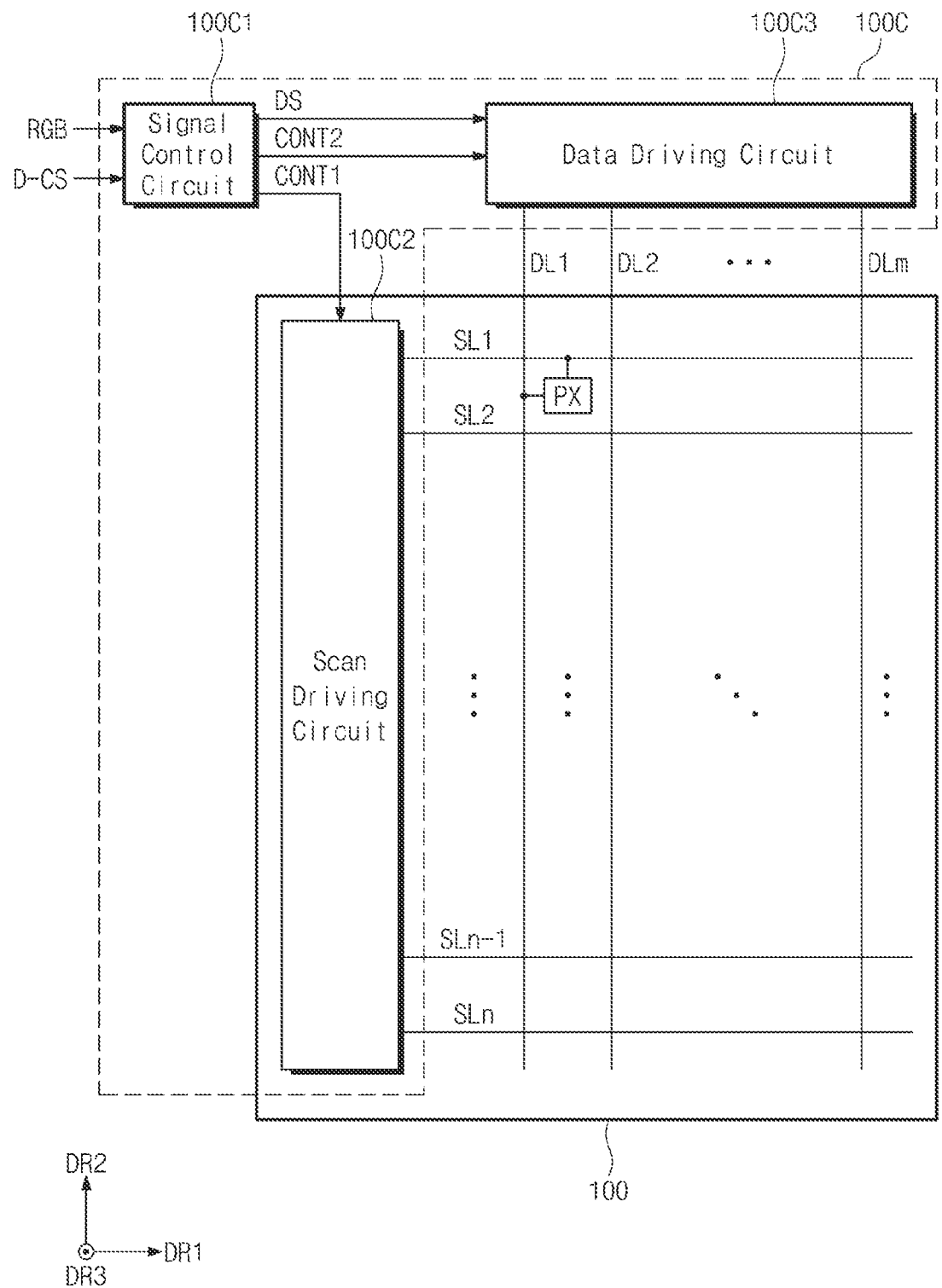
FIG. 5 is a block diagram of a display panel and a display controller according to an embodiment of the inventive concept.

FIG. 5 illustrates a display panel and a display controller according to an embodiment of the inventive concept.

Referring to FIG. 5, the display panel 100 may include one or more scan lines SL1 to SLn, one or more data lines DL1 to DLm, and one or more pixels PX. Each of the one or more pixels PX is connected to a corresponding one of the one or more data lines DL1 to DLm and a corresponding scan line of the one or more scan lines SL1 to SLn. In an embodiment of the inventive concept, the display panel 100 may further include emission control lines, and the display controller 100C may further include an emission driving circuit providing emission control signals to the emission control lines. The configuration of the display panel 100 is not limited thereto.

Each of the one or more scan lines SL1 to SLn may extend along the first direction DR1, and the one or more scan lines SL1 to SLn may be arranged spaced apart from each other in the second direction DR2. Each of the one or more data lines DL1 to DLm may extend along the second direction DR2, and each of the one or more data lines DL1 to DLm may be arranged spaced apart from each other in the first direction DR1.

The display controller 100C may include a signal control circuit 100C1, a scan driving circuit 100C2, and a data driving circuit 100C3.

The signal control circuit 100C1 may receive the image signal RGB and the display control signal D-CS from the main controller 1000C (see FIG. 2). The display control signal D-CS may include various signals. For example, the display control signal D-CS may include a vertical synchronization signal, a horizontal synchronization signal, a main clock signal, and a data enable signal.

The signal control circuit 10001 may generate a scan control signal CONT1 based on the display control signal D-CS and output the scan control signal CONT1 to the scan driving circuit 10002. The scan control signal CONT1 may include a vertical start signal and a clock signal. The signal control circuit 10001 may generate a data control signal CONT2 based on the display control signal D-CS and output the data control signal CONT2 to the data driving circuit 10003. The data control signal CONT2 may include a horizontal start signal and an output enable signal.

In addition, the signal control circuit 10001 may generate image data DS by processing the image signal RGB according to the operating conditions of the display panel 100, and output the image data DS to the data driving circuit 10003. The scan control signal CONT1 and the data control signal CONT2 are signals for the operation of the scan driving circuit 10002 and the data driving circuit 10003, but are not limited thereto.

The scan driving circuit 10002 drives one or more scan lines SL1 to SLn in response to the scan control signal CONT1. In an embodiment of the inventive concept, the scan driving circuit 10002 may be formed by the same process as the circuit layer 120 (see FIG. 4) in the display panel 100, but is not limited thereto. Optionally, the scan driving circuit 10002 is implemented as an integrated circuit (IC) and is directly mounted on a predetermined area of the display panel 100 or mounted on a separate printed circuit board in a chip on film (COF) method to be electrically connected to the display panel 100.

The data driving circuit 10003 may output data voltages (or data signals) to the one or more data lines DL1 to DLm in response to the data control signal CONT2 and the image data DS from the signal control circuit 10001. The data driving circuit 10003 may be implemented as an integrated circuit and directly mounted on a predetermined area of the display panel 100 or may be mounted on a separate circuit board in a chip-on-film method and electrically connected to the display panel 100, but the inventive concept is not limited thereto. Optionally, the data driving circuit 10003 may be formed through the same process as the circuit layer 120 (see FIG. 4) of the display panel 100.

Figure 6:
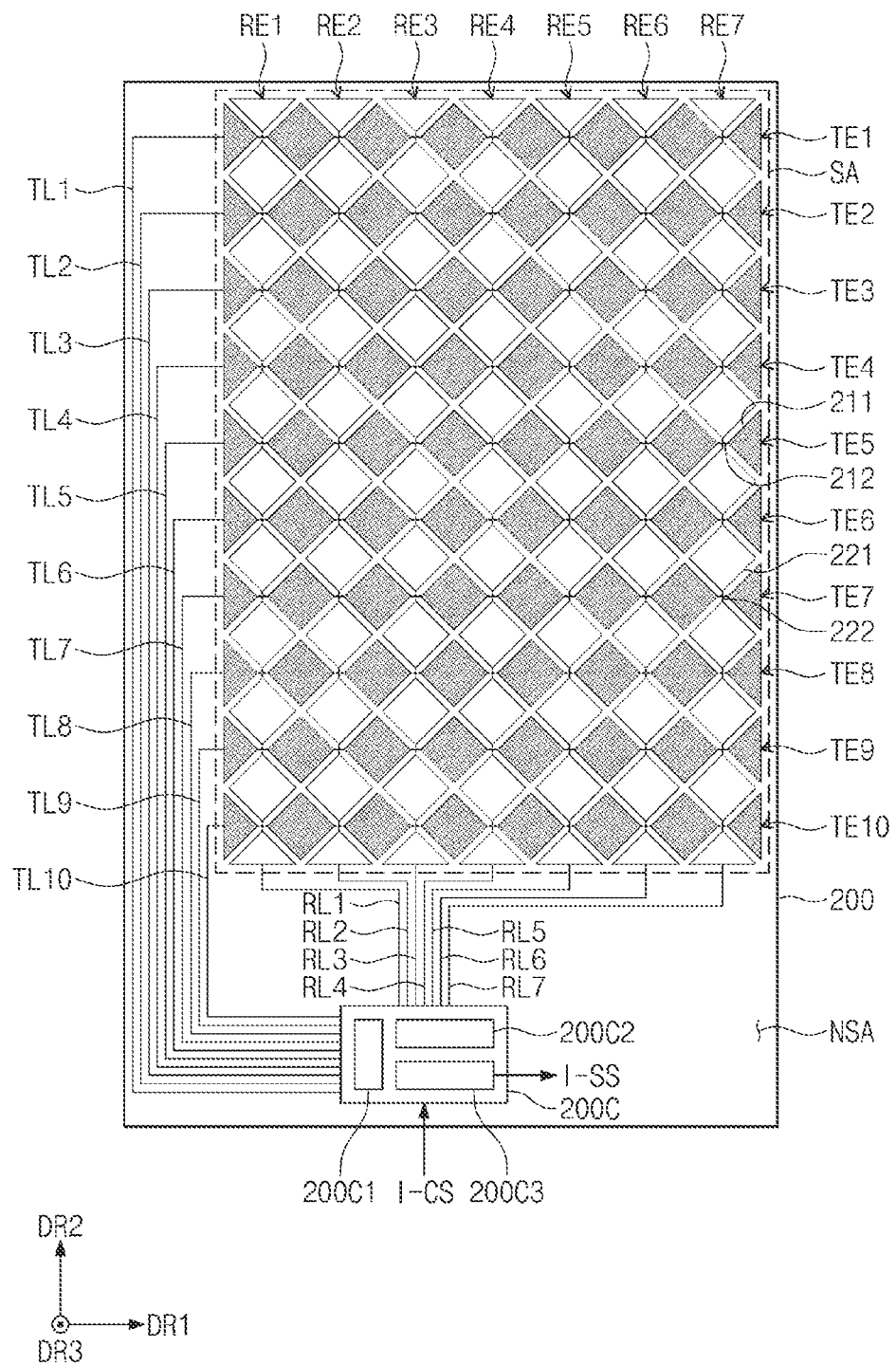
FIG. 6 is a block diagram of an input sensor and a sensor controller according to an embodiment of the inventive concept.

FIG. 6 illustrates an input sensor and a sensor controller according to an embodiment of the inventive concept.

Referring to FIG. 6, the input sensor 200 may include one or more transmission electrodes TE1 to TE10 (or first detection electrodes) and one or more reception electrodes RE1 to RE7 (or second detection electrodes). The one or more transmission electrodes TE1 to TE10 may extend along the first direction DR1 and may be arranged in the second direction DR2. The one or more reception electrodes RE1 to RE7 may extend along the second direction DR2 and be arranged in the first direction DR1. The one or more transmission electrodes TE1 to TE10 may cross the one or more reception electrodes RE1 to RE7. Mutual capacitance may be formed between the one or more transmission electrodes TE1 to TE10 and the one or more reception electrodes RE1 to RE7.

The input sensor 200 may further include one or more transmission wires TL1 to TL10 (or first signal wires) connected to one or more transmission electrodes TE1 to TE10 and one or more reception wires RL1 to RL7 (or second signal wires) connected to the one or more reception electrodes RE1 to RE7.

The input sensor 200 includes a sensing area SA and a non-sensing area NSA. The sensing area SA may correspond to the active area AA shown in FIG. 1, and the non-sensing area NSA may correspond to the peripheral area NAA shown in FIG. 1. The sensing area SA may be an area in which one or more transmission electrodes TE1 to TE10 and one or more reception electrodes RE1 to RE7 are disposed to substantially sense an input. The non-sensing area NSA may be an area in which the transmission wires TL1 to TL10 and the reception wires RL1 to RL7 are disposed so that input is not actually sensed in the non-sensing area NSA.

Each of the one or more transmission electrodes TE1 to TE10 may include a first detection part 211 and a bridge part 212. Two first detection parts 211 adjacent to each other may be electrically connected to each other by the bridge part 212, but are not limited thereto. The first detection part 211 and the bridge part 212 may be disposed on different layers.

Each of the one or more reception electrodes RE1 to RE7 may include a second detection part 221 and a connection part 222. The second detection part 221 and the connection part 222 have integral shapes and may be disposed on the same layer. Each of the one or more transmission electrodes TE1 to TE10 may have a mesh shape, and each of the one or more reception electrodes RE1 to RE7 may have a mesh shape.

The first and second detection parts 211 and 221, the bridge part 212, and the connection part 222 may include a metal layer. Each of the first and second detection parts 211 and 221, the bridge part 212, and the connection part 222 may have a mesh shape.

In FIG. 6, the input sensor 200 provided with 10 transmission electrodes TE1 to TE10 and 7 reception electrodes RE1 to RE7 is illustratively shown, but the number of transmission electrodes TE1 to TE10 and reception electrodes RE1 to RE7 is not limited thereto.

As shown in FIG. 6, the sensor controller 2000 may receive the sensing control signal I-CS from the main controller 1000C (see FIG. 2), and provide the coordinate signal I-SS to the main controller 1000C.

The sensor controller 2000 may be implemented as an integrated circuit (IC) to be directly mounted on a predetermined area of the input sensor 200 or to be mounted on a separate printed circuit board in a chip on film (COF) method, and may be electrically connected to the input sensor 200.

The sensor controller 2000 may include a signal generation circuit 20001, a signal reception circuit 20002, and a signal processing circuit 20003. The sensor generation circuit 200C1 generates one or more transmission signals based on the sensing control signal I-CS. The sensor generation circuit 200C1 may determine the frequency of one or more transmission signals in consideration of the lengths of the one or more transmission wires TL1 to TL10 and the frequency components of display noise generated in the display panel 100 (see FIG. 2). As an example of the inventive concept, one or more transmission signals may have different frequencies. In addition, the sensor generation circuit 200C1 may simultaneously output one or more transmission signals to one or more transmission wires TL1 to TL10. When one or more transmission signals are simultaneously output to the one or more transmission wires TL1 to TL10 (e.g., simultaneous output method), compared to the case of sequentially applying one or more transmission signals to one or more transmission wires TL1 to TL10 (e.g., sequential output method), the time required for input detection may be shortened. As the number of transmission electrodes TE1 to TE10 increases, the time reduction effect of the simultaneous output method may become more pronounced.

The sensor generation circuit 200C1 is electrically connected to one or more transmission electrodes TE1 to TE10 through one or more transmission wires TL1 to TL10. Accordingly, the one or more transmission signals generated from the sensor generation circuit 200C1 may be applied to the one or more transmission electrodes TE1 to TE10 through the one or more transmission wires TL1 to TL10, respectively.

The signal reception circuit 200C2 is electrically connected to the one or more reception electrodes RE1 to RE7 through the one or more reception wires RL1 to RL7. Accordingly, the signal reception circuit 200C2 may receive one or more sensing signals through the one or more reception wires RL1 to RL7. Each of the one or more sensing signals may include one or more frequency components respectively corresponding to one or more transmission signals.

The signal reception circuit 200C2 may amplify and filter the received analog sensing signals, and provide the filtered signal to the signal processing circuit 200C3. The signal processing circuit 200C3 may generate the coordinate signal I-SS based on the sensing signals received from the signal reception circuit 200C2. The signal processing circuit 200C3 may include a fast Fourier transform unit that processes the sensing signals using a fast Fourier transform method. The fast Fourier transform unit may perform fast Fourier transform on the sensing signals, analyze one or more frequency components included in each sensing signal, and generate a coordinate signal I-SS for a position provided with an input.

Figure 7A:
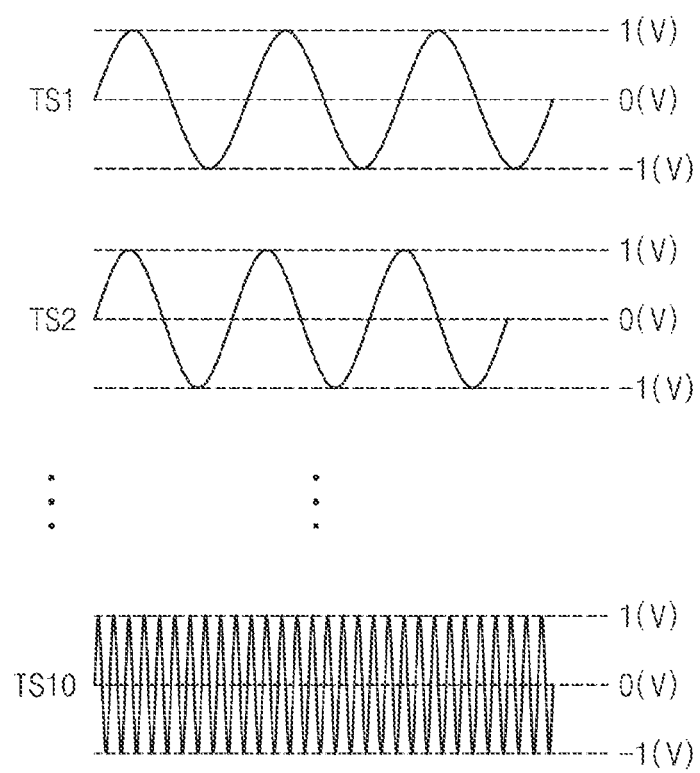
FIG. 7A is a waveform diagram illustrating transmission signals according to an embodiment of the inventive concept.
Figure 7B:
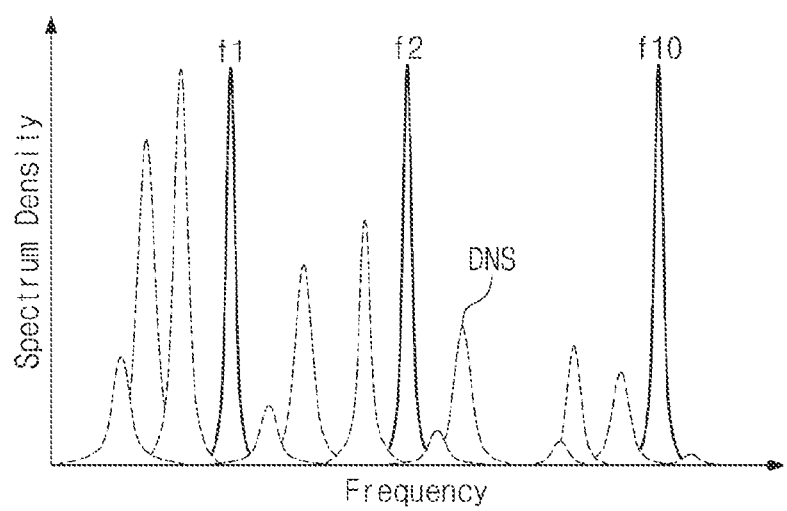
FIG. 7B is a waveform diagram illustrating transmission signals and display noise according to an embodiment of the inventive concept.

FIG. 7A illustrates transmission signals according to an embodiment of the inventive concept, and FIG. 7B illustrates transmission signals and display noise according to an embodiment of the inventive concept.

Referring to FIGS. 6 and 7A, one or more transmission electrodes (hereinafter, the first to tenth transmission electrodes TE1 to TE10) may receive one or more transmission signals (hereinafter, first to tenth transmission signals TS1 to TS10) from the sensor controller 2000. The first to tenth transmission signals TS1 to TS10 may be provided to the first to tenth transmission electrodes TE1 to TE10 through one or more transmission wires (hereinafter, the first to tenth transmission wires TL1 to TL10). As shown in FIG. 6, the first to tenth transmission wires TL1 to TL10 have different lengths. The tenth transmission wire TL10 closest to the sensor controller 2000 may have the shortest length among the 1st to 10th transmission wires TL1 to TL10, and the first transmission wire TL1 farthest from the sensor controller 2000 may have the longest length among the first to tenth transmission wires TL1 to TL10. Due to this length difference, the first transmission wire TL1 may have a greater wire resistance or impedance than the tenth transmission wire TL10.

Therefore, when applying a transmission signal having the same frequency (e.g., a high frequency of 300 Hz or more) to the first and tenth transmission wires TL1 and TL10, transmission power of the transmission signal is lower in the first transmission wire TL1 than in the tenth transmission wire TL10. However, a low-frequency transmission signal has superior transmission power compared to a high-frequency transmission signal. Therefore, the first transmission signal TS1 having a low frequency is applied to the first transmission wire TL1 having a relatively large wire resistance, and the tenth transmission signal TS10 having a higher frequency than the first transmission signal TS1 may be applied to the tenth transmission wire TL10 having a relatively small wire resistance.

As a result, when the wire lengths of the first to tenth transmission wires TL1 to TL10 are different from each other, the frequencies of the first to tenth transmission signals TS1 to TS10 may be set differently according to the wire length. Therefore, even if the signal transmittance is degraded due to wire resistance, by lowering the frequency of transmission signals applied to transmission wires having high wire resistance, the signal transmitting power of these transmission wires may be compensated for. As a result, it is possible to stably supply a transmission signal even to a transmission electrode located at a long distance.

The length of the second transmission wire TL2 is shorter than the length of the first transmission wire TL1. Accordingly, the second transmission signal TS2 applied to the second transmission wire TL2 may have a higher frequency than the first transmission signal TS1 applied to the first transmission wire TL1. The length of the tenth transmission wire TL10 is shorter than the length of the second transmission wire TL2. Accordingly, the tenth transmission signal TS10 applied to the tenth transmission wire TL10 may have a higher frequency than the second transmission signal TS2 applied to the second transmission wire TL2. That is, the tenth transmission signal TS10 among the first to tenth transmission signals TS1 to TS10 may have the highest frequency, and the first transmission signal TS1 among the first to tenth transmission signals TS1 to TS10 may have the lowest frequency.

As an example of the inventive concept, the frequencies of the first to tenth transmission signals TS1 to TS10 may be different from each other, but the amplitudes of the first to tenth transmission signals TS1 to TS10 may be the same. For example, each of the first to tenth transmission signals TS1 to TS10 may have a sine wave shape swinging between about 1 V and about −1 V, and may have an amplitude corresponding to about 2 V.

Although FIG. 7A illustratively shows that each of the first to tenth transmission signals TS1 to TS10 is a pulse wave swinging with reference to about 0 V (e.g., a reference voltage), the inventive concept is not limited thereto. The reference voltage of each of the first to tenth transmission signals TS1 to TS10 may be a voltage other than about 0 V. In addition, each of the first to tenth transmission signals TS1 to TS10 may have a square wave or triangular wave shape instead of a sine wave shape.

Referring to FIG. 7B, the frequency of each of the first to tenth transmission signals TS1 to TS10 may be set considering the frequency component of display noise DNS that occurs differently for each position of the display panel 100 (see FIG. 5). In one embodiment of the inventive concept, display noise DNS generated from the display panel 100 may appear large in a frequency band of about 300 Hz or less.

Each of the first to tenth transmission signals TS1 to TS10 may have a frequency at which display noise DNS is relatively small for each position of the display panel 100. The first transmission signal TS1 may have a first frequency f1 representing a relatively low display noise DNS at the first position of the display panel 100 corresponding to the first transmission electrode TE1. The second transmission signal TS2 may have a second frequency f2 representing a relatively low display noise DNS at the second position of the display panel 100 corresponding to the second transmission electrode TE2. The second frequency f2 may be higher than the first frequency f2. The tenth transmission signal TS10 may have a tenth frequency f10 representing a relatively small display noise DNS at the first position of the display panel 100 corresponding to the tenth transmission electrode TE10. However, the tenth frequency f10 may be higher than the first and second frequencies f1 and f2.

The first frequency f1 may be the lowest frequency among the first to tenth frequencies f1 to f10, and the tenth frequency f10 may be the highest frequency among the first to tenth frequencies f1 to f10. The first to tenth frequencies f1 to f10 may gradually decrease from the tenth frequency f10 to the first frequency f1. Each of the first to tenth frequencies f1 to f10 may be a frequency that does not overlap with a frequency band in which the size of the display noise DNS is larger than a preset reference value, respectively.

Therefore, it is possible to prevent the first to tenth transmission signals TS1 to TS10 from being distorted due to the display noise DNS, and as a result, it is possible to prevent deterioration in sensing performance of the input sensor 200 (see FIG. 6).

Figure 8:
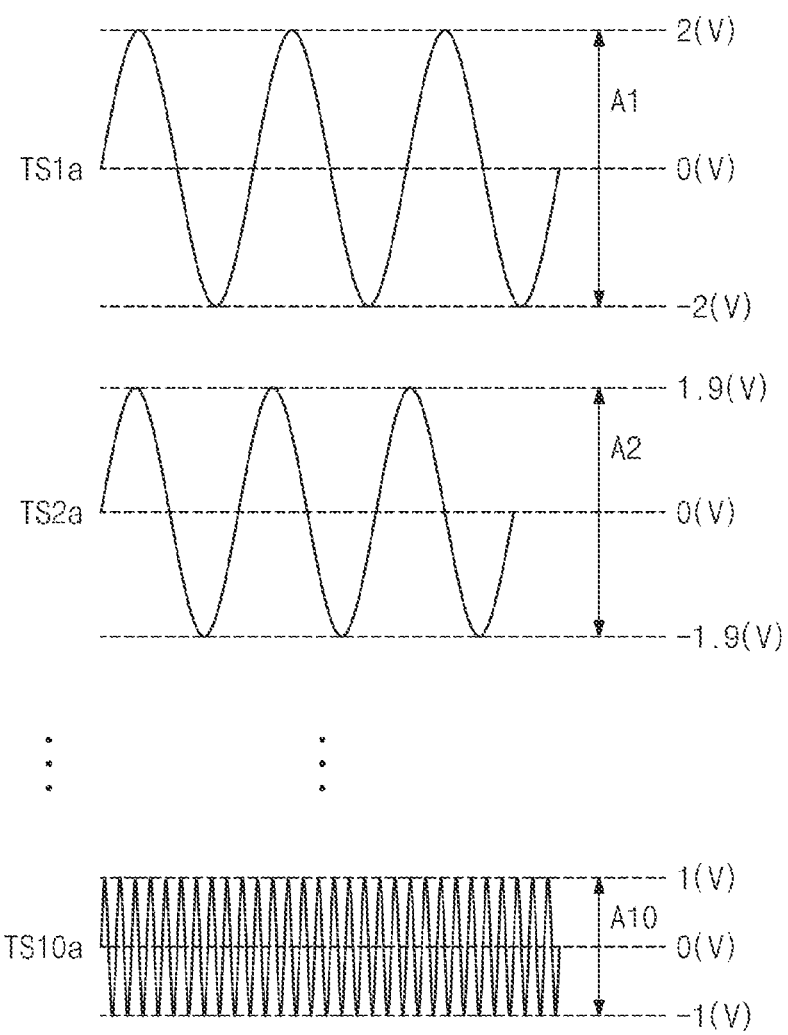
FIG. 8 is a waveform diagram illustrating transmission signals according to an embodiment of the inventive concept.
Figure 9A:
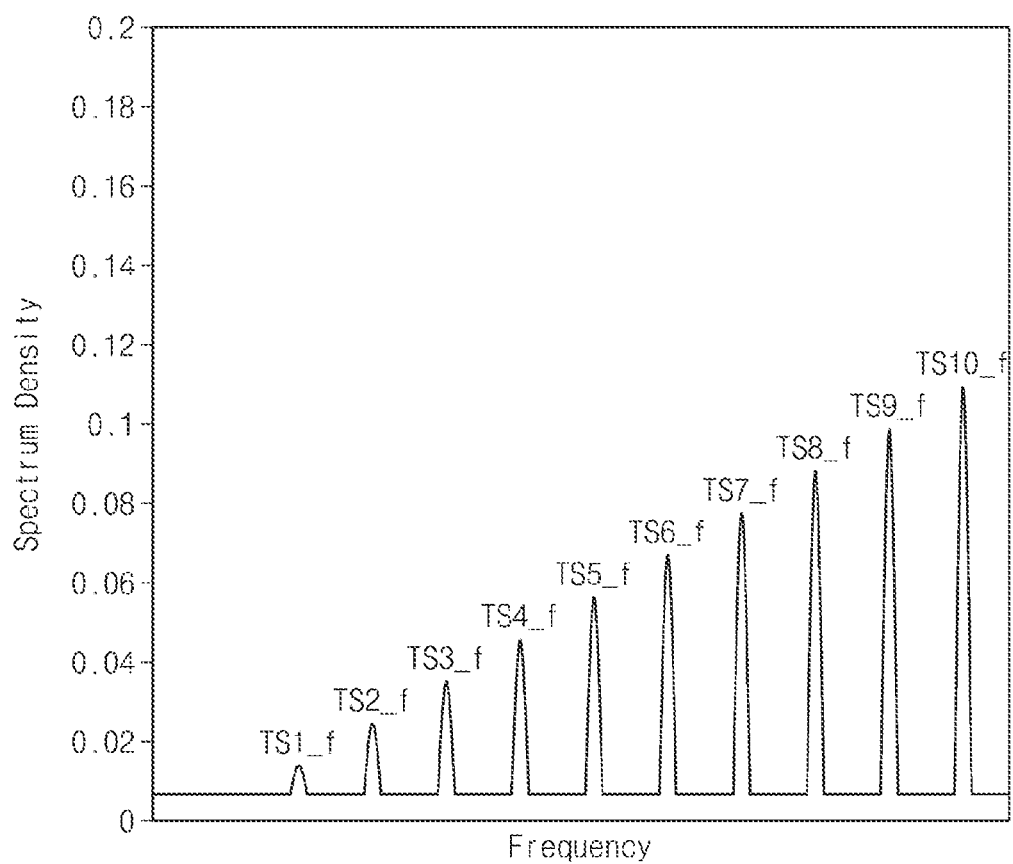
FIGS. 9A and 9B are waveform diagrams illustrating results of high-speed frequency conversion of sensing signals according to embodiments of the inventive concept.
Figure 9B:
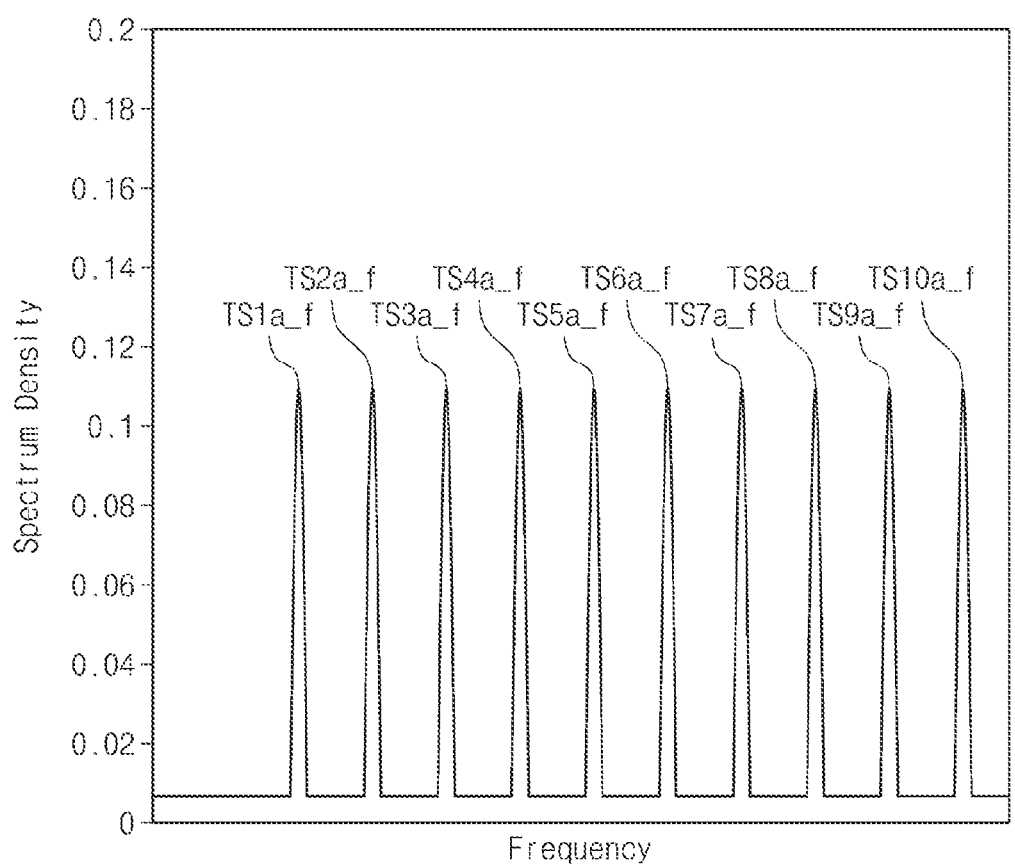

FIG. 8 illustrates transmission signals according to an embodiment of the inventive concept. FIGS. 9A and 9B are waveform diagrams illustrating results of high-speed frequency conversion of sensing signals according to embodiments of the inventive concept.

Referring to FIGS. 6 and 8, one or more transmission electrodes (hereinafter, the first to tenth transmission electrodes TE1 to TE10) may receive one or more transmission signals (hereinafter, first to tenth transmission signals TS1a to TS10a) from the sensor controller 2000. The first to tenth transmission signals TS1a to TS10a may be provided to the first to tenth transmission electrodes TE1 to TE10 through one or more transmission wires (hereinafter, the first to tenth transmission wires TL1 to TL10). The first to tenth transmission wires TL1 to TL10 have different lengths. Due to this length difference, the first to tenth transmission wires TL1 to TL10 have different wire resistances.

The frequencies of the first to tenth transmission signals TS1a to TS10a may be set differently according to the wire lengths of the first to tenth transmission wires TL1 to TL10. Therefore, even if the signal transmittance is degraded due to wire resistance, by lowering the frequency of transmission signals applied to transmission wires having high wire resistance, the signal transmitting power of these transmission wires may be compensated for. As a result, it is possible to stably supply a transmission signal even to a transmission electrode located at a long distance.

As an example of the inventive concept, the amplitudes of the first to tenth transmission signals TS1a to TS10a may be different from each other. For example, the first transmission signal TS1a may have the largest amplitude among the first to tenth transmission signals TS1a to TS10a, and the tenth transmission signal TS10a may have the smallest amplitude among the first to tenth transmission signals TS1a to TS10a. Amplitudes of the first to tenth transmission signals TS1a to TS10a may gradually increase from the tenth transmission signal TS10a to the first transmission signal TS1a.

For example, the first transmission signal TS1a may have a sine wave shape swinging between about 2 V and about −2 V, and may have a first amplitude A1 corresponding to about 4 V. The second transmission signal TS2a may have a sine wave shape swinging between about 1.9 V and about −1.9 V, and may have a second amplitude A2 corresponding to about 3.8 V. The tenth transmission signal TS10a may have a sine wave shape swinging between about 1 V and about −1 V, and may have a tenth amplitude A10 corresponding to about 2 V.

Although FIG. 8 illustratively shows that each of the first to tenth transmission signals TS1a to TS10a is a pulse wave swinging with reference to about 0 V (e.g., a reference voltage), the inventive concept is not limited thereto. The reference voltage of each of the first to tenth transmission signals TS1a to TS10a may be a voltage other than about 0 V. In addition, each of the first to tenth transmission signals TS1a to TS10a may have a square wave or triangular wave shape instead of a sine wave shape.

FIG. 9A illustrates a result of high-speed frequency conversion of one of the sensing signals received through the signal reception circuit 200C2 (see FIG. 6) when the first to tenth transmission signals TS1 to TS10 shown in FIG. 7A are applied to the first to tenth transmission electrodes TE1 to TE10. As shown in FIG. 7A, when the first to tenth transmission signals TS1 to TS10 have the same amplitude, magnitudes of the first to tenth frequency components TS1_f, TS2_f, TS3_f, TS4_f, TS5_f, TS6_f, TS7_f, TS8_f, TS9_f and TS10_f respectively corresponding to the first to tenth transmission signals TS1 to TS10 included in the sensing signal may be different from each other. The signal processing circuit 200C3 may generate the coordinate signal I-SS (see FIG. 6) after compensating for the magnitudes of the first to tenth frequency components TS1_f to TS10_f included in the sensing signal. As an example of the inventive concept, the signal processing circuit 200C3 may perform software compensation so that the magnitudes of the first to tenth frequency components TS1_f to TS10_f become the same.

FIG. 9B illustrates a result of high-speed frequency conversion of one of the sensing signals received through the signal reception circuit 200C2 (see FIG. 6) when the first to tenth transmission signals TS1a to TS10a shown in FIG. 8 are applied to the first to tenth transmission electrodes TE1 to TE10. As shown in FIG. 8, when the first to tenth transmission signals TS1a to TS10a have different amplitudes according to the lengths of the first to tenth transmission wires TL1 to TL10, magnitudes of the first to tenth frequency components TS1a_f, TS2_f, TS3_f, TS4_f, TS5_f, TS6_f, TS7_f, TS8_f, TS9_f and TS10a_f respectively corresponding to the first to tenth transmission signals TS1a to TS10a included in the sensing signal may be equal to (or similar to) each other. When the magnitudes of the first to tenth frequency components TS1a_f to TS1a_f are equal to (or similar to) each other, the signal processing circuit 200C3 may generate the coordinate signal I-SS (see FIG. 6) by omitting the process of compensating for the magnitudes of the first to tenth frequency components TS1a_f to TS10a_f.

The difference value between the amplitudes of the 1st to 10th transmission signals TS1a to TS10a may be set so that the first to 10th frequency components TS1a_f to TS10a_f have a magnitude difference included within a preset allowable range.

FIGS. 10A and 10B illustrate transmission signals according to embodiments of the inventive concept.

Referring to FIG. 10A, one or more transmission signals (e.g., first to tenth transmission signals TS1b to TS10b) may be divided into two or more groups (e.g., first to fifth groups TG1 to TG5) having different frequencies.

As an example of the inventive concept, the first group TG1 includes first and second transmission signals TS1b and TS2b, the second group TG2 includes the third and fourth transmission signals TS3b and TS4b, and the fifth group TG5 includes the ninth and tenth transmission signals TS9b and TS10b. Transmission signals included in each group may have the same frequency. That is, the first and second transmission signals TS1b and TS2b have the same frequency, the third and fourth transmission signals TS3b and TS4b may have the same frequency, and the ninth and tenth transmission signals TS9b and TS10b may have the same frequency. However, this embodiment of the inventive concept is not limited thereto. Transmission signals included in each group may have different frequencies.

The transmission signals of the first group TG1 may have different frequencies from the transmission signals of the second group TG2. Lengths of transmission wires for receiving transmission signals TS1b and TS2b of the first group TG1 are longer than lengths of transmission wires for receiving transmission signals TS3b and TS4b of the second group TG2. Accordingly, the first and second transmission signals TS1b and TS2b have frequencies lower than those of the third and fourth transmission signals TS3b and TS4b. The lengths of transmission wires for receiving transmission signals TS3b and TS4b of the second group TG2 are longer than the lengths of transmission wires for receiving transmission signals TS9b and TS10b of the fifth group TG5. Accordingly, the third and fourth transmission signals TS3b and TS4*b* may have lower frequencies than the ninth and tenth transmission signals TS9*b* and TS10*b*.

Different codes may be assigned to the transmission signals of each of the groups TG1 to TG5. Different codes are assigned to the first and second transmission signals TS1*b* and TS2*b* of the first group TG1, and different codes are assigned to the third and fourth transmission signals TS3*b* and TS4*b* of the second group TG2. Different codes are assigned to the ninth and tenth transmission signals TS9*b* and TS10*b* of the tenth group TG10. Therefore, even if the first and second transmission signals TS1*b* and TS2*b* have the same frequency, coordinate signals may be generated based on codes assigned differently from each other.

The amplitudes of the first to tenth transmission signals TS1*b* to TS10*b* may be the same. For example, each of the first to tenth transmission signals TS1*b* to TS10*b* may have a square wave shape swinging between about 1 V and about −1 V, and may have an amplitude corresponding to about 2 V.

Although FIG. 10A illustratively shows that each of the first to tenth transmission signals TS1*b* to TS10*b* is a square wave swinging with respect to 0V (e.g., a reference voltage), the inventive concept is not limited thereto. The reference voltage of each of the first to tenth transmission signals TS1*b* to TS10*b* may be a voltage other than about 0 V.

Although FIG. 10A illustrates a case in which two transmission signals are included in each group, the inventive concept is not limited thereto. For example, three or more transmission signals may be included in each group.

Referring to FIG. 10B, the amplitudes of the first to tenth transmission signals TS1*c* to TS10*c* may be different from each other. For example, the first and second transmission signals TS1*c* and TS2*c* may have the largest amplitude among the first to tenth transmission signals TS1*c* to TS10*c*, and the ninth and tenth transmission signals TS9*c* and T10*c* may have the smallest amplitude among the first to tenth transmission signals TS1*c* to TS10*c*. Amplitudes of the first to tenth transmission signals TS1*c* to TS10*c* may gradually increase from the fifth group TG5*a* to the first group TG1*a*.

For example, the first and second transmission signals TS1*c* and TS2*c* of the first group TG1*a* may have a square wave shape swinging between about 2 V and about −2 V, and may have an amplitude corresponding to about 4 V. The third and fourth transmission signals TS3*c* and TS4*c* of the second group TG2*a* may have a square wave shape swinging between about 1.8 V and about −1.8 V, and may have an amplitude corresponding to about 3.6 V. The ninth and tenth transmission signals TS9*c* and TS10*c* of the fifth group TG5*a* may have a rectangular wave shape swinging between about 1 V and about −1 V, and may have an amplitude corresponding to about 2 V.

Figure 11:
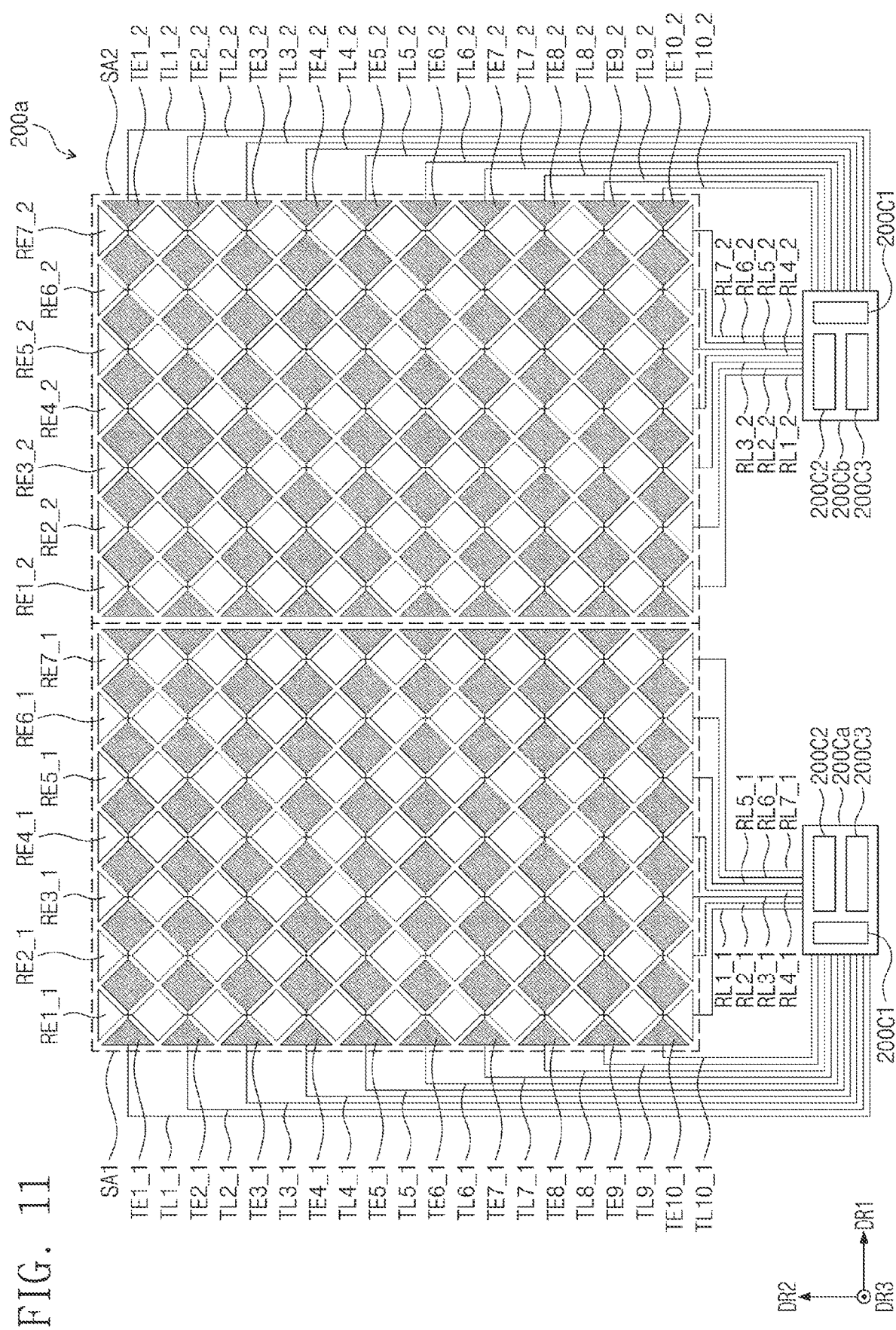
FIG. 11 is a block diagram of an input sensor and a sensor controller according to an embodiment of the inventive concept.

FIG. 11 illustrates an input sensor and a sensor controller according to an embodiment of the inventive concept.

Referring to FIG. 11, the input sensor 200*a* includes a first sensing area SA1 and a second sensing area SA2. The first sensing area SA1 and the second sensing area SA2 may be adjacent to each other in the first direction DR1. Although it is shown that the input sensor 200*a* includes two sensing areas SA1 and SA2, the inventive concept is not limited thereto. Alternatively, the input sensor 200*a* may include three or more sensing areas.

The input sensor 200*a* includes one or more first-side transmission electrodes TE1_1 to TE10_1 disposed in the first sensing area SA1 and one or more first-side reception electrodes RE1_1 to RE7_1 disposed in the first sensing area SA1. The input sensor 200*a* further includes one or more second-side transmission electrodes TE1_2 to TE10_2 disposed in the second sensing area SA2 and one or more second side reception electrodes RE1_2 to RE7_2 disposed in the second sensing area SA2.

The sensor controller includes a first sensor controller 200Ca that controls the operation of the first sensing area SA1 and a second sensor controller 200Cb that controls the operation of the second sensing area SA2. Each of the first and second sensor controllers 200Ca and 200Cb may include a signal generation circuit 200C1, a signal reception circuit 200C2, and a signal processing circuit 200C3. The first and second sensor controllers 200Ca and 200Cb may be implemented as separate chips.

The one or more first-side transmission electrodes TE1_1 to TE10_1 are electrically connected to the first sensor controller 200Ca through first-side transmission wires TL1_1 to TL10_1. The one or more second-side transmission electrodes TE1_2 to TE10_2 are electrically connected to the second sensor controller 200Cb through second-side transmission wires TL1_2 to TL10_2.

A first-first transmission signal applied to a first-first transmission electrode TE1_1 disposed in a first row among the one or more first-side transmission electrodes TE1_1 to TE10_1 may have a different frequency from a first-tenth transmission signal applied to a first-tenth transmission electrode TE10_1 disposed in the 10th row among the one or more first-side transmission electrodes. The length of a first-first transmission wire TL1_1 connected to the first-first transmission electrode TE1_1 is longer than the length of a first-tenth transmission wire TL10_1 connected to the first-tenth transmission electrode TE10_1. Accordingly, the first-first transmission signal may have a lower frequency than the first-tenth transmission signal.

A second-first transmission signal applied to a second-first transmission electrode TE1_2 disposed in the first row among the one or more second-side transmission electrodes TE1_2 to TE10_2 may have a different frequency than a second-tenth transmission signal applied to a second-tenth transmission electrode TE10_2 disposed in the tenth row among the one or more second-side transmission electrodes TE1_2 to TE10_2. The length of the second-first transmission wire TL1_2 connected to the second-first transmission electrode TE1_2 is longer than the length of the second-tenth transmission wire TL10_2 connected to the second-tenth transmission electrode TE10_2. Accordingly, the second-first transmission signal may have a lower frequency than the second-tenth transmission signal.

The second-first to second-tenth transmission electrodes TE1_2 to TE10_2 may be disposed corresponding to the first-first to first-tenth transmission electrodes TE1_1 to TE10_1, respectively. As shown in FIG. 11, the second-first to second-tenth-transmission electrodes TE1_2 to TE10_2 may be electrically separated from the first-first to first-tenth transmission electrodes TE1_1 to TE10_1, respectively.

A first-(k-th) transmission signal applied to the first-(k-th)transmission electrode disposed in the k-th row (where k is a natural number of 1 or more) among the one or more first-side transmission electrodes TE1_1 to TE10_1 may have the same frequency as a second-(k-th) transmission signal applied to the second-(k-th) transmission electrode disposed in the k-th row among the one or more second-side transmission electrodes TE1_2 to TE10_2. That is, the (2-1)-th transmission signal applied to the second-first transmission electrode TE1_2 may have the same frequency as the first-first transmission signal applied to the first-first transmission electrode TE1_1. In addition, the second-tenth transmission signal applied to the second-tenth transmission electrode TE10_2 may have the same frequency as the first-tenth transmission signal applied to the first-tenth transmission electrode TE10_1.

Alternatively, the second-first to second-tenth transmission electrodes TE1_2 to TE10_2 may be electrically connected to first-first to first-tenth transmission electrodes TE1_1 to TE10_1, respectively. For example, the second-first transmission electrode TE1_2 may be electrically connected to the first-first transmission electrode TE1_1, and the second-second transmission electrode TE2_2 may be electrically connected to the first-second transmission electrode TE2_1.

A first-((k+1)-th) transmission signal applied to a first-((k+1)-th) transmission electrode disposed in a (k+1)-th row among the one or more first-side transmission electrodes TE1_1 to TE10_1 has a frequency different from that of a first-(k-th) transmission signal applied to a first-(k-th) transmission electrode disposed in a k-th row among the one or more first-side transmission electrodes TE1_1 to TE10_1.

A second-((k+1)-th) transmission signal applied to a second-((k+1)-th) transmission electrode disposed in a (k+1)-th row among the one or more second-side transmission electrodes TE1_2 to TE10_2 has a frequency different from that of a second-(k-th) transmission signal applied to a second-(k-th) transmission electrode disposed in a k-th row among the one or more second-side transmission electrodes TE1_2 to TE10_2.

According to the inventive concept, a transmission signal applied to a transmission wire having a relatively high wire resistance or impedance has a lower frequency than a transmission signal applied to a transmission wire having a low wire resistance. Therefore, even if a difference in signal transmission power occurs due to a difference in length of transmission wires, a transmission signal may be stably supplied to a transmission electrode located at a long distance from the sensor controller.

In addition, the transmission signals output to each of the transmission wires have different frequencies, and each has a frequency that does not overlap with a frequency of display noise generated at a position of a display panel facing a corresponding transmission electrode, respectively. Accordingly, it is possible to minimize or prevent distortion due to the influence of display noise, and as a result, it is possible to minimize or prevent deterioration of sensing performance of the input sensor.

Although illustrative embodiments of the inventive concept have been described by way of example, it is understood that the inventive concept should not be limited to these embodiments, but rather that various changes and modifications may be made by those of ordinary skill in the pertinent art without departing from the spirit and scope of the inventive concept as hereinafter claimed.

What is claimed is:

1. A display device comprising:
    a display panel;
    an input sensor disposed on the display panel; and
    a sensor controller connected to the input sensor,
    wherein the input sensor comprises:
        a plurality of transmission electrodes;
        a plurality of reception electrodes that form mutual capacitors with the plurality of transmission electrodes, respectively;
        a plurality of transmission wires electrically connecting the plurality of transmission electrodes to the sensor controller; and
        a plurality of reception wires electrically connecting the plurality of reception electrodes to the sensor controller,
    wherein the sensor controller provides a plurality of transmission signals having different frequencies based on different lengths of the plurality of transmission wires to the plurality of transmission electrodes, respectively,
    wherein a frequency of each of the plurality of transmission signals does not overlap with a frequency component of display noise generated at a position of the display panel corresponding to each of the plurality of transmission electrodes, respectively,
    wherein the sensor controller receives a plurality of sensing signals through the plurality of reception wires, respectively,
    wherein each of the plurality of sensing signals comprises a plurality of frequency components respectively corresponding to the plurality of transmission signals,
    wherein the plurality of transmission signals have different amplitudes based on different lengths of the plurality of transmission wires so that magnitudes of the plurality of frequency components are equal.

2. The display device of claim 1, wherein a first transmission wire among the plurality of transmission wires has a first length, and a first transmission signal applied to the first transmission wire among the plurality of transmission signals has a first frequency,
    wherein a second transmission wire among the plurality of transmission wires has a second length shorter than the first length, and a second transmission signal applied to the second transmission wire among the plurality of transmission signals has a second frequency higher than the first frequency.

3. The display device of claim 2, wherein a first amplitude of the first transmission signal is different from a second amplitude of the second transmission signal.

4. The display device of claim 3, wherein the first amplitude of the first transmission signal is greater than the second amplitude of the second transmission signal.

5. The display device of claim 1, wherein the sensor controller simultaneously outputs the plurality of transmission signals to the plurality of transmission wires.

6. The display device of claim 1, wherein the sensor controller comprises a signal processing circuit that receives the plurality of sensing signals and analyzes the plurality of frequency components included in each sensing signal to calculate coordinate information provided with the input.

7. The display device of claim 1, wherein the sensor controller assigns different codes to the plurality of transmission signals and outputs the plurality of transmission signals to the plurality of transmission wires.

8. The display device of claim 1, wherein the input sensor comprises a first sensing area and a second sensing area adjacent to the first sensing area,
    wherein the sensor controller comprises:
    a first sensor controller controlling an operation of the first sensing area; and
    a second sensor controller controlling an operation of the second sensing area.

9. The display device of claim 8, wherein the plurality of transmission electrodes comprise:
    a plurality of first-side transmission electrodes disposed in the first sensing area; and
    a plurality of second-side transmission electrodes disposed in the second sensing area, wherein a first-(k-th) transmission signal applied to a first-(k-th) transmission electrode disposed in a k-th row among the plurality of first-side transmission electrodes has the same frequency as a second-(k-th) transmission signal applied to a second-(k-th) transmission electrode disposed in a k-th row among the plurality of second-side transmission electrodes.

10. The display device of claim 9, wherein a first-((k+1)-th) transmission signal applied to the a first-((k+1)-th) transmission electrode disposed in a (k+1)-th row among the plurality of first-side transmission electrodes has a frequency different from that of the first-(k-th) transmission signal applied to the first-(k-th) transmission electrode disposed in the k-th row among the plurality of first-side transmission electrodes, wherein a second-((k+1)-th) transmission signal applied to a second-((k+1)-th) transmission electrode disposed in a (k+1)-th row among the plurality of second-side transmission electrodes has a frequency different from that of the second-(k-th) transmission signal applied to the second-(k-th) transmission electrode disposed in the k-th row among the plurality of second-side transmission electrodes.

11. An electronic A display device comprising:
a display panel configured to display an image;
an input sensor disposed on the display panel and configured to sense an input; and
a sensor controller configured to control driving of the input sensor,
wherein the input sensor comprises:
a plurality of transmission electrodes;
a plurality of reception electrodes configured to form mutual capacitors with the plurality of transmission electrodes, respectively;
a plurality of transmission wires electrically connecting the plurality of transmission electrodes to the sensor controller; and
a plurality of reception wires electrically connecting the plurality of reception electrodes to the sensor controller,
wherein the sensor controller provides a plurality of transmission signals to the plurality of transmission electrodes, respectively,
wherein the plurality of transmission signals are divided into two or more groups having different frequencies, and different codes are assigned to transmission signals of each group,
wherein the sensor controller receives a plurality of sensing signals through the plurality of reception wires, respectively,
wherein each of the plurality of sensing signals comprises a plurality of frequency components respectively corresponding to the plurality of transmission signals,
wherein the plurality of transmission signals have different amplitudes based on different lengths of the plurality of transmission wires so that magnitudes of the plurality of frequency components are equal.

12. The electronic device of claim 11, wherein among the two or more groups, a first-first transmission signal of a first group has a first frequency,
wherein among the two or more groups, a second-first transmission signal of a second group has a second frequency higher than the first frequency.

13. The electronic device of claim 12, wherein a length of a first-first transmission wire for transmitting the first-first transmission signal among the plurality of transmission wires is longer than a length of a second-first transmission wire for transmitting the second-first transmission signal among the plurality of transmission wires.

14. The electronic device of claim 11, wherein the sensor controller simultaneously outputs the plurality of transmission signals to the plurality of transmission wires.

15. The electronic device of claim 11, wherein the sensor controller comprises a fast Fourier transform processor configured to receive the plurality of sensing signals, analyze the plurality of frequency components included in each sensing signal, and calculate coordinate information provided with the input.

16. The electronic device of claim 11, wherein the input sensor comprises a first sensing area and a second sensing area adjacent to the first sensing area,
wherein the sensor controller comprises:
a first sensor controller controlling an operation of the first sensing area; and
a second sensor controller controlling an operation of the second sensing area.

17. The electronic device of claim 16, wherein the plurality of transmission electrodes comprise:
a plurality of first-side transmission electrodes disposed in the first sensing area; and
a plurality of second-side transmission electrodes disposed in the second sensing area,
wherein a first-(k-th) transmission signal applied to a first-(k-th) transmission electrode disposed in a k-th row among the plurality of first-side transmission electrodes has the same frequency as a second-(k-th) transmission signal applied to a second-(k-th) transmission electrode disposed in a k-th row among the plurality of second-side transmission electrodes.

18. The electronic device of claim 17, wherein a first-((k+1)-th) transmission signal applied to a first-((k+1)-th) transmission electrode disposed in a (k+1)-th row among the plurality of first-side transmission electrodes has a frequency different from that of the first-(k-th) transmission signal applied to the first-(k-th) transmission electrode disposed in the k-th row among the plurality of first-side transmission electrodes,
wherein a second-((k+1)-th) transmission signal applied to a second-((k+1)-th) transmission electrode disposed in a (k+1)-th row among the plurality of second-side transmission electrodes has a frequency different from that of the second-(k-th) transmission signal applied to the second-(k-th) transmission electrode disposed in the k-th row among the plurality of second-side transmission electrodes.

* * * * *